US012392309B2

(12) United States Patent
Boswell et al.

(10) Patent No.: US 12,392,309 B2
(45) Date of Patent: Aug. 19, 2025

(54) EXHAUST GAS RECIRCULATION VALVE ASSEMBLY

(71) Applicant: Power Packer North America, Inc., Westfield, WI (US)

(72) Inventors: Mark Jason Boswell, Corning, IA (US); Timothy Garritt House, Urbandale, IA (US)

(73) Assignee: Power Packer North America, Inc., Westfield, WI (US)

( * ) Notice: Subject to any disclaimer, the term of this patent is extended or adjusted under 35 U.S.C. 154(b) by 0 days.

(21) Appl. No.: 18/416,117

(22) Filed: Jan. 18, 2024

(65) Prior Publication Data

US 2024/0280071 A1 Aug. 22, 2024

Related U.S. Application Data

(60) Provisional application No. 63/485,725, filed on Feb. 17, 2023.

(51) Int. Cl.
*F02M 26/70* (2016.01)
*F02M 26/11* (2016.01)
(Continued)

(52) U.S. Cl.
CPC ............ *F02M 26/70* (2016.02); *F02M 26/11* (2016.02); *F02M 26/54* (2016.02); *F02M 26/21* (2016.02)

(58) Field of Classification Search
CPC ........ F02M 26/70; F02M 26/11; F02M 26/54; F02M 26/21
(Continued)

(56) References Cited

U.S. PATENT DOCUMENTS 5,531,205 A 7/1996 Cook et al.
6,178,956 B1 1/2001 Steinmann et al.
(Continued)

FOREIGN PATENT DOCUMENTS

DE 102005033997 A1 1/2007
DE 102009016597 B4 10/2012
(Continued)

OTHER PUBLICATIONS

European Patent Office Partial Search Report for Application No. 24155111.8 dated May 15, 2024 (10 pages).
(Continued)

*Primary Examiner* — Lindsay M Low
*Assistant Examiner* — Omar Morales
(74) *Attorney, Agent, or Firm* — Michael Best & Friedrich LLP

(57) ABSTRACT

An exhaust gas recirculation (EGR) valve assembly includes a valve housing with a wall defining a flow passage. The valve housing defines a bore communicating with the flow passage. A shaft is supported in the bore and extends into the flow passage. A flap is supported on the shaft in the flow passage. The flap is movable relative to the flow passage between a closed position and an open position. A sealing member projects from the wall into the flow path. The sealing member has a sealing surface that interacts with the flap in the closed position to inhibit gas flow through the flow passage, an opposite surface tapering toward the wall, and a circumferential end surface proximate and tapered away from the bore. The flap is coined against the sealing surface. A spider assembly is positioned between the shaft and a drive shaft of an actuator assembly.

28 Claims, 21 Drawing Sheets

(51) Int. Cl.
*F02M 26/54* (2016.01)
*F02M 26/21* (2016.01)

(58) Field of Classification Search
USPC .................................................... 123/568.11
See application file for complete search history.

(56) References Cited

U.S. PATENT DOCUMENTS

| | | | |
|---|---|---|---|
| 6,598,619 | B2 | 7/2003 | Gagnon |
| 6,681,799 | B2 | 1/2004 | Gagnon |
| 6,698,717 | B1 * | 3/2004 | Brookshire ............. F16K 1/222 251/308 |
| 7,234,444 | B2 * | 6/2007 | Nanba ................... F02D 9/1045 251/306 |
| 7,536,990 | B2 | 5/2009 | Willats et al. |
| 7,600,738 | B2 | 10/2009 | Hatano et al. |
| 7,971,578 | B2 | 7/2011 | Lim et al. |
| 8,187,106 | B2 | 5/2012 | Muenich et al. |
| 8,434,736 | B2 | 5/2013 | Sumiya et al. |
| 9,739,241 | B2 | 8/2017 | Bareis et al. |
| 10,060,311 | B2 | 8/2018 | Hwang et al. |
| 10,060,360 | B2 | 8/2018 | Delplanque et al. |
| 10,184,566 | B2 | 1/2019 | Haesen |
| 10,443,754 | B2 | 10/2019 | Steinhauser |
| 10,450,969 | B2 | 10/2019 | Stark et al. |
| 10,480,659 | B2 | 11/2019 | Schmitt et al. |
| 10,487,710 | B2 | 11/2019 | Suzuki et al. |
| 10,508,741 | B2 | 12/2019 | Schmitt et al. |
| 10,641,408 | B2 | 5/2020 | Sigg et al. |
| 10,711,706 | B2 | 7/2020 | Aigner et al. |
| 10,760,699 | B2 | 9/2020 | Kienle et al. |
| 10,794,299 | B2 | 10/2020 | Lee et al. |
| 10,823,088 | B2 | 11/2020 | Zeumer et al. |
| 10,920,678 | B2 | 2/2021 | Delplanque et al. |
| 10,927,797 | B2 | 2/2021 | Oblinger et al. |
| 10,982,771 | B2 | 4/2021 | Botella et al. |
| 11,105,275 | B2 | 8/2021 | Zeumer et al. |
| 11,220,982 | B2 | 1/2022 | Winter et al. |
| 11,333,084 | B2 | 5/2022 | Zeumer et al. |
| 11,408,529 | B2 | 8/2022 | Schmitt et al. |
| 11,448,142 | B2 | 9/2022 | Ishii et al. |
| 11,466,629 | B2 | 10/2022 | Lory et al. |
| 2011/0031425 | A1 | 2/2011 | Tyler |
| 2017/0284310 | A1 * | 10/2017 | Delplanque ............. F16K 1/221 |
| 2019/0170092 | A1 | 6/2019 | Oblinger et al. |
| 2019/0195146 | A1 | 6/2019 | Ishii |
| 2020/0392886 | A1 | 12/2020 | De Matos et al. |
| 2021/0246841 | A1 | 8/2021 | Edler et al. |
| 2021/0254559 | A1 | 8/2021 | Ishii et al. |
| 2022/0010738 | A1 | 1/2022 | Grün et al. |
| 2022/0228533 | A1 | 7/2022 | Grün et al. |
| 2022/0228534 | A1 | 7/2022 | Grün et al. |
| 2022/0275877 | A1 | 9/2022 | Ambrosino et al. |

FOREIGN PATENT DOCUMENTS

| | | | |
|---|---|---|---|
| DE | 102013103105 | B4 | 6/2015 |
| DE | 102014017523 | A1 | 6/2015 |
| DE | 102014113332 | B3 | 11/2015 |
| DE | 102009013815 | B4 | 9/2016 |
| DE | 102015202211 | B4 | 6/2017 |
| DE | 102016112694 | A1 | 1/2018 |
| DE | 102016223444 | B3 | 5/2018 |
| DE | 102016203794 | B4 | 3/2019 |
| DE | 202019102211 | U1 | 7/2019 |
| DE | 102011107088 | C5 | 10/2019 |
| DE | 102019120959 | A1 | 2/2020 |
| DE | 102017222465 | B4 | 5/2021 |
| EP | 2172638 | B1 | 11/2011 |
| EP | 3171010 | A1 | 5/2017 |
| EP | 4008892 | A1 | 6/2022 |
| FR | 3080426 | B1 | 4/2020 |
| FR | 3084415 | B1 | 11/2021 |

OTHER PUBLICATIONS

European Patent Office Extended Search Report for Application No. 24155111.8 dated Oct. 31, 2024 (13 pages).

European Patent Office Extended Search Report for Application No. 25156687.3 dated May 8, 2025 (7 pages).

European Patent Office Action for Application No. 25156687.3 dated Jun. 10, 2025 (2 pages).

* cited by examiner

EXHAUST GAS RECIRCULATION VALVE ASSEMBLY

CROSS-REFERENCE TO RELATED APPLICATIONS

This application claims priority to U.S. Provisional Patent Application No. 63/485,725 filed on Feb. 17, 2023, the entire contents of which is incorporated herein by reference.

FIELD

The present disclosure generally relates to valve assemblies and, more particularly, to exhaust gas recirculation (EGR) valve assemblies.

BACKGROUND

In general, EGR valve assemblies are used to control the recirculation of exhaust gases through combustion chambers within internal combustion engines. Exhaust gas recirculation that is improperly controlled may result in air/fuel mixtures that are too rich or too lean for efficient combustion.

SUMMARY

In one independent aspect, a valve assembly, such as an EGR valve assembly, may generally include a valve housing including a body with a wall defining a flow passage along a flow path between an inlet and an outlet, the valve housing further defining a bore communicating with the flow passage and extending transverse to the flow path; a shaft supported in the bore and extending into the flow passage; a flap supported on the shaft in the flow passage, the flap being movable relative to the flow passage between a closed position and an open position; and a sealing member projecting from the wall into the flow path, the sealing member having a sealing surface configured to interact with the flap in the closed position to inhibit gas flow through the flow passage, an opposite surface facing away from the sealing surface and tapering toward the wall, and a circumferential end surface proximate the bore, the end surface being tapered away from the bore.

In another independent aspect, a method of manufacturing a valve assembly, such as an EGR valve assembly, may be provided. The valve assembly may include a valve housing with a body having a wall defining a flow passage along a flow path between an inlet and an outlet, a flap supported in the flow passage for movement between a closed position and an open position, a first sealing member projecting from the wall into the flow path, the first sealing member having a first sealing surface configured to interact with a first portion of the flap in the closed position to inhibit gas flow through the flow passage, and a second sealing member projecting from the wall into the flow path, the second sealing member having a second sealing surface configured to interact with a second portion of the flap in the closed position to inhibit gas flow through the flow passage. The method may generally include supporting the flap in the flow passage with the first portion of the flap engaging the first sealing surface and the second portion of the flap engaging the second sealing surface; engaging, through the inlet, a first ram against a side of the first portion of the flap opposite the first sealing surface; engaging, through the outlet, a second ram against a side of the second portion of the flap opposite the second sealing surface; and simultaneously applying, with the first ram and the second ram, force to the flap to coin the first portion of the flap against the first sealing surface and to coin the second portion of the flap against the second sealing surface.

In yet another independent aspect, a valve assembly, such as an EGR valve assembly, may generally include a valve housing including a body with a wall defining a flow passage along a flow path between an inlet and an outlet; a shaft supported by the valve housing and extending into the flow passage, the shaft extending along and being pivotable about a shaft axis; a flap supported on the shaft in the flow passage, the flap being movable relative to the flow passage between a closed position, in which flow of gas through the flow passage is inhibited, and an open position; an actuator assembly including a drive shaft extending along and pivotable about a drive axis; and a spider assembly configured to drivingly connect the drive shaft and the shaft. The spider assembly may include a spider member defining a first slot facing toward the drive shaft and extending along a first slot axis and a second slot facing toward the shaft and extending along second slot axis, the second slot axis being transverse to the first slot axis, a first sliding member connectable to the drive shaft and positionable in the first slot, the first sliding member being configured to slide in the first slot and along the first slot axis, and a second sliding member connectable to the shaft and positionable in the second slot, the second sliding member being configured to slide in the second slot and along the second slot axis.

Other independent aspects of the disclosure may become apparent by consideration of the detailed description, claims and accompanying drawings.

DETAILED DESCRIPTION

Figure 1:
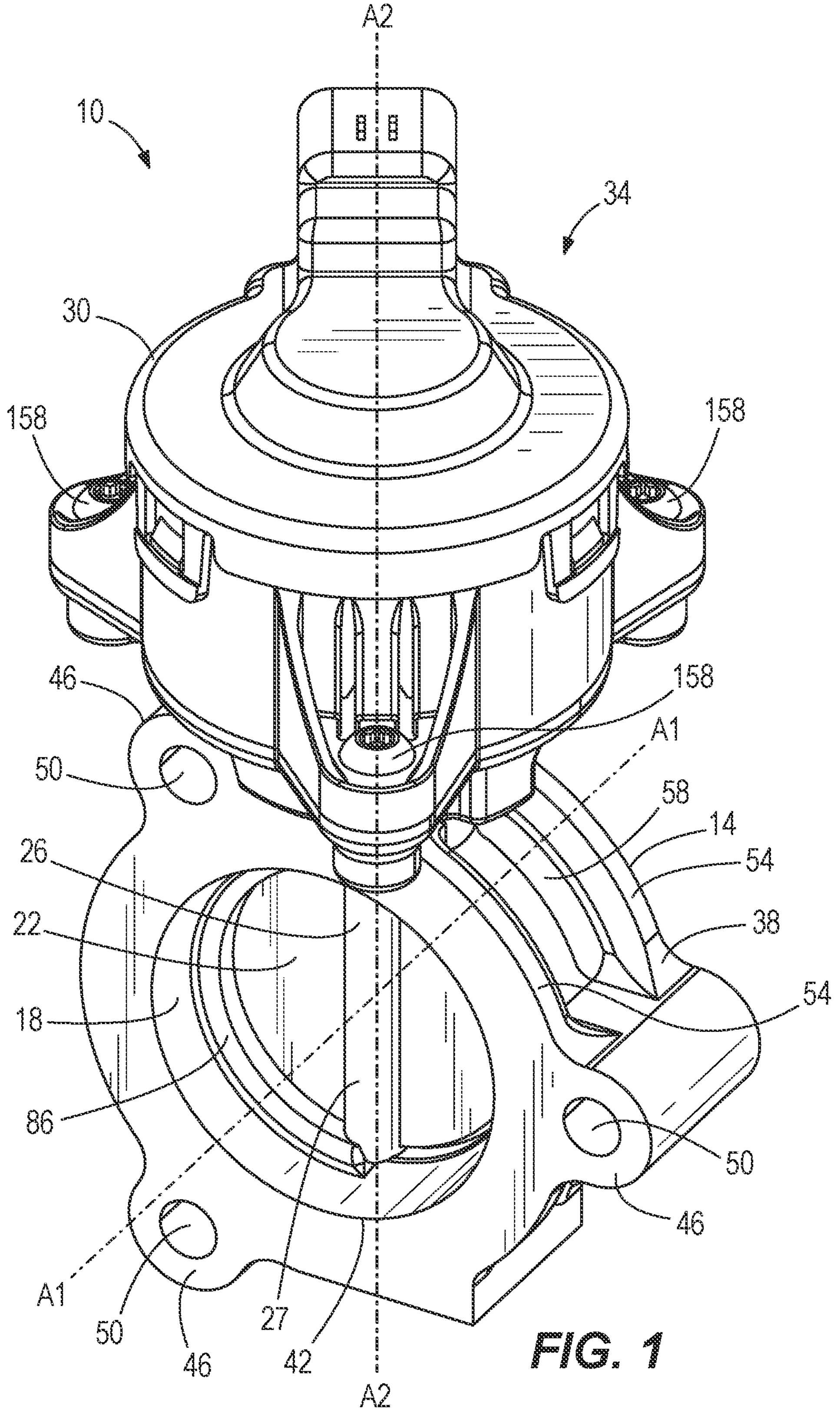
FIG. 1 is a perspective view of a valve assembly, such as an EGR valve assembly.
Figure 3:
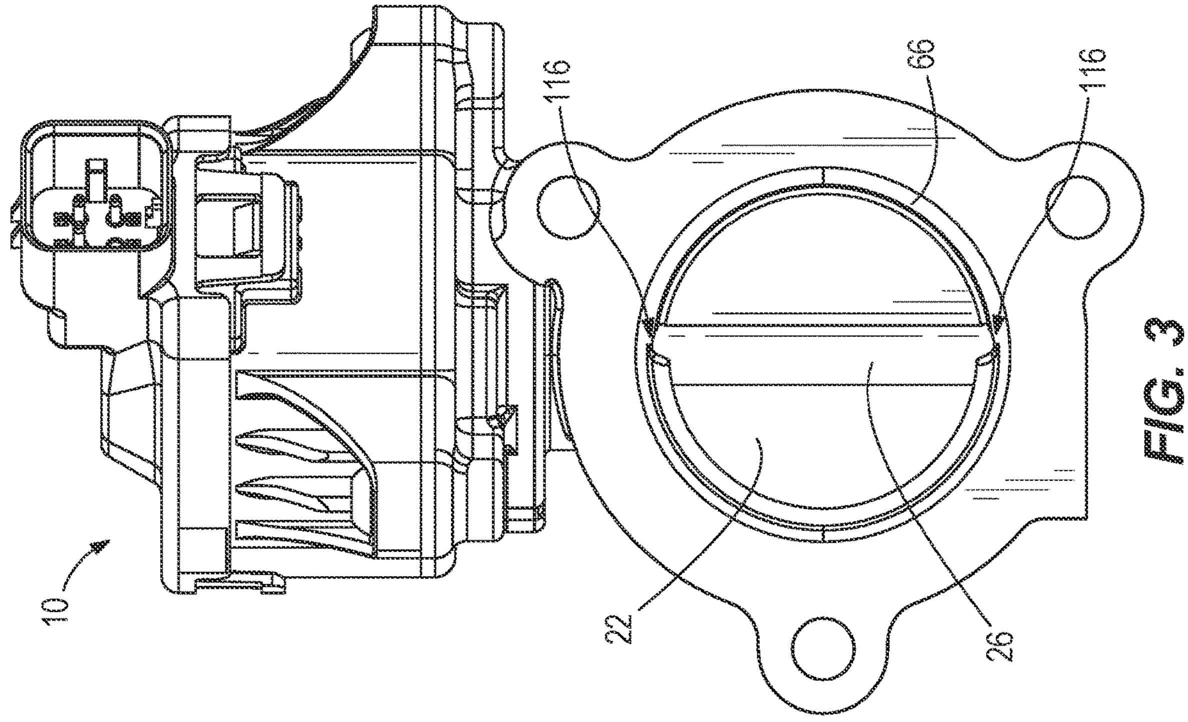
FIG. 3 is a rear elevation view of the valve assembly of FIG. 1, opposite the view of FIG. 2.
Figure 2:
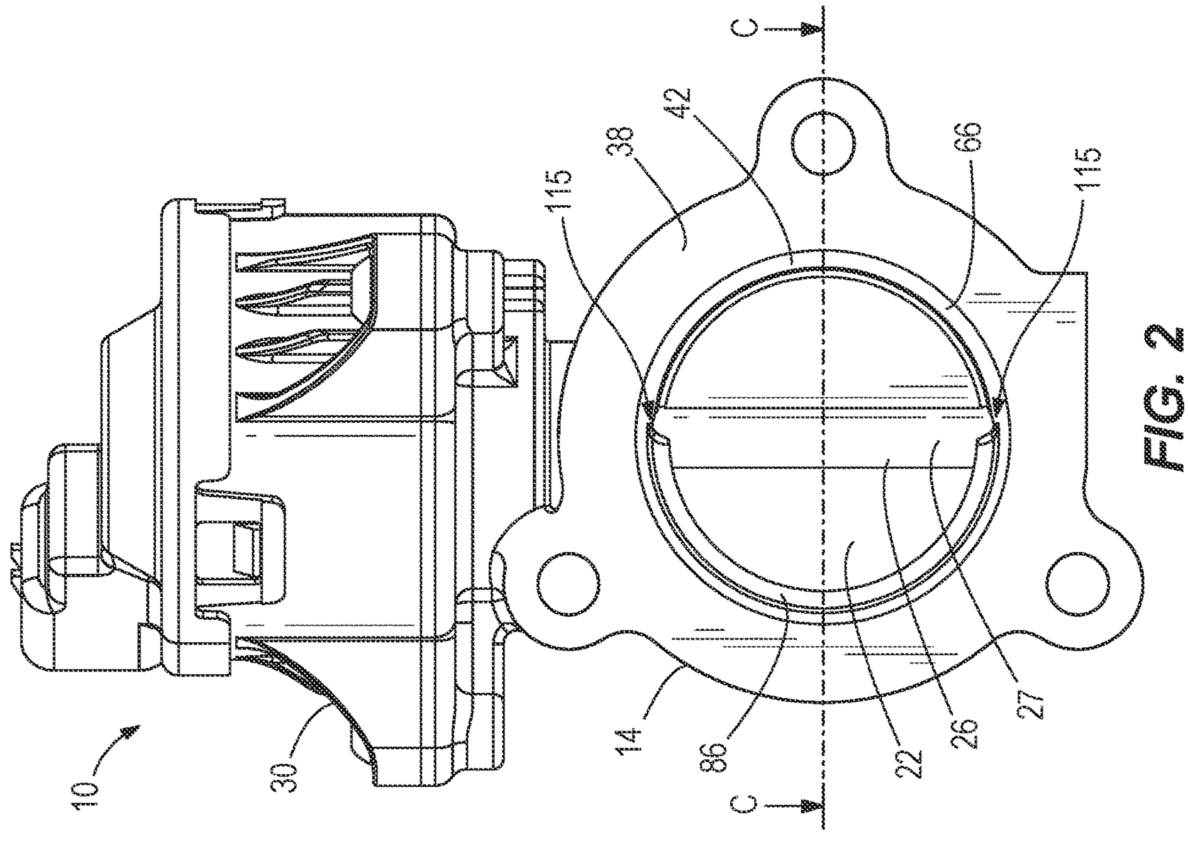
FIG. 2 is a front elevation view of the valve assembly of FIG. 1.
Figure 5:
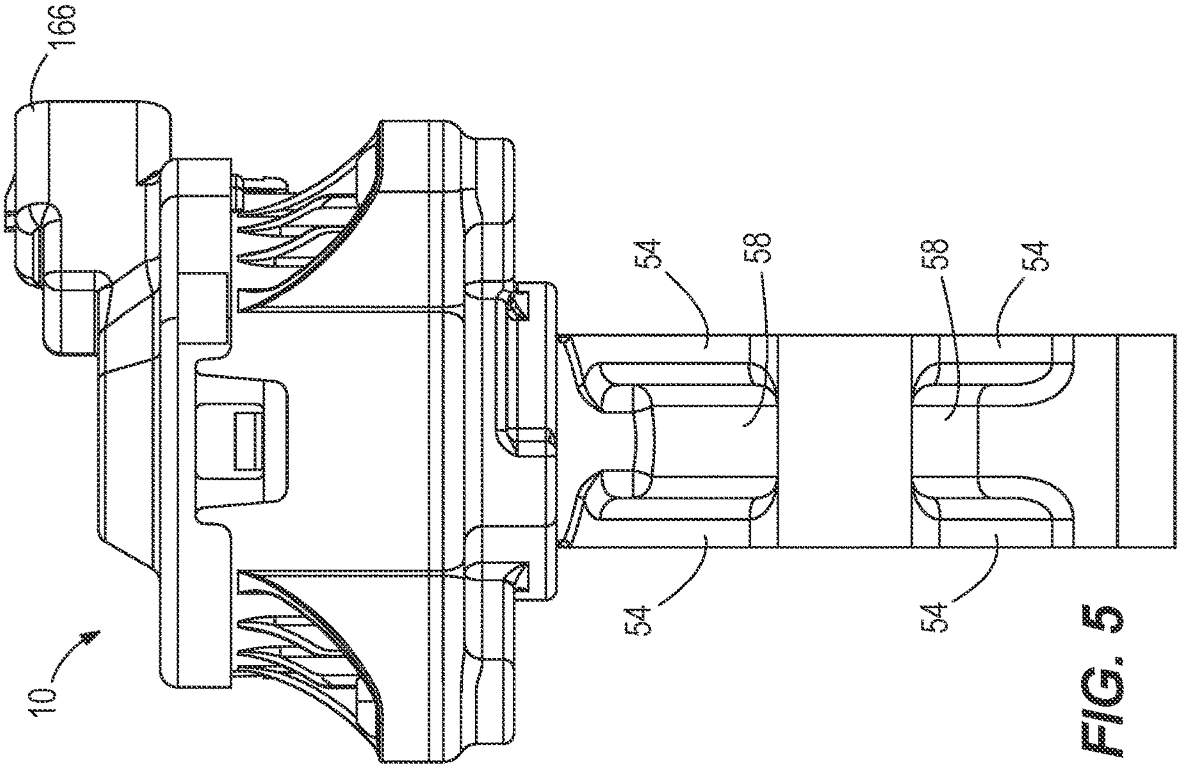
FIG. 5 is an opposite side view of the valve assembly of FIG. 1.
Figure 4:
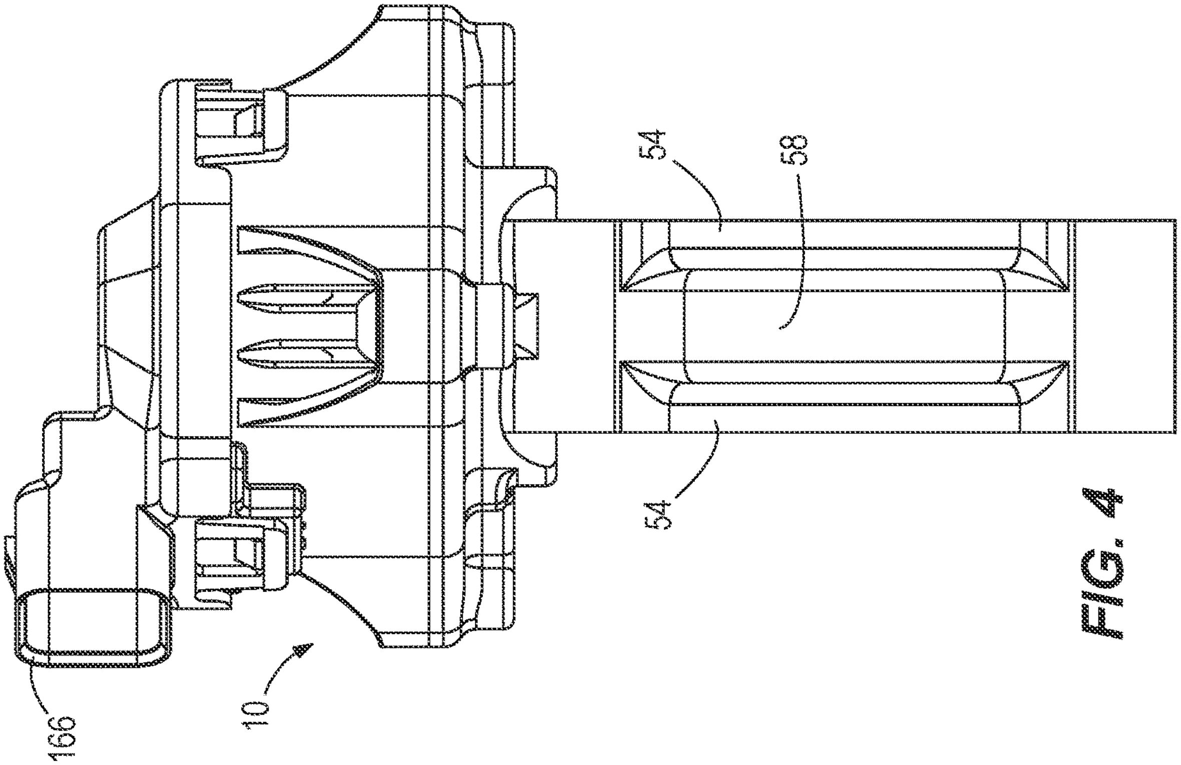
FIG. 4 is a side view of the valve assembly of FIG. 1.
Figure 6:
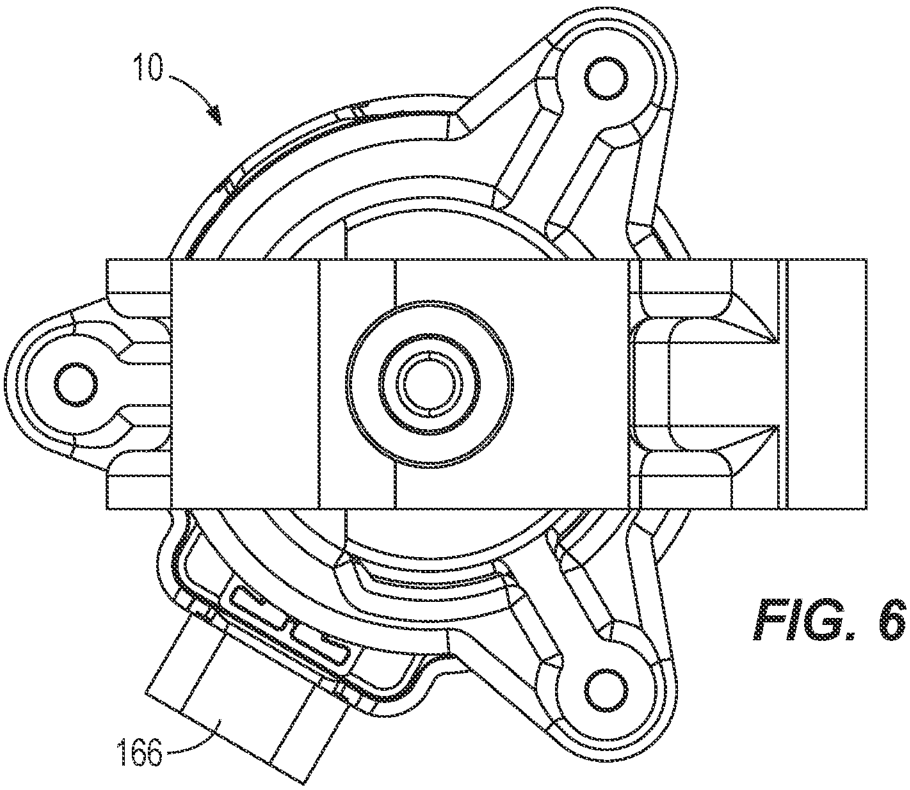
FIG. 6 is a bottom view of the valve assembly of FIG. 1.
Figure 7:
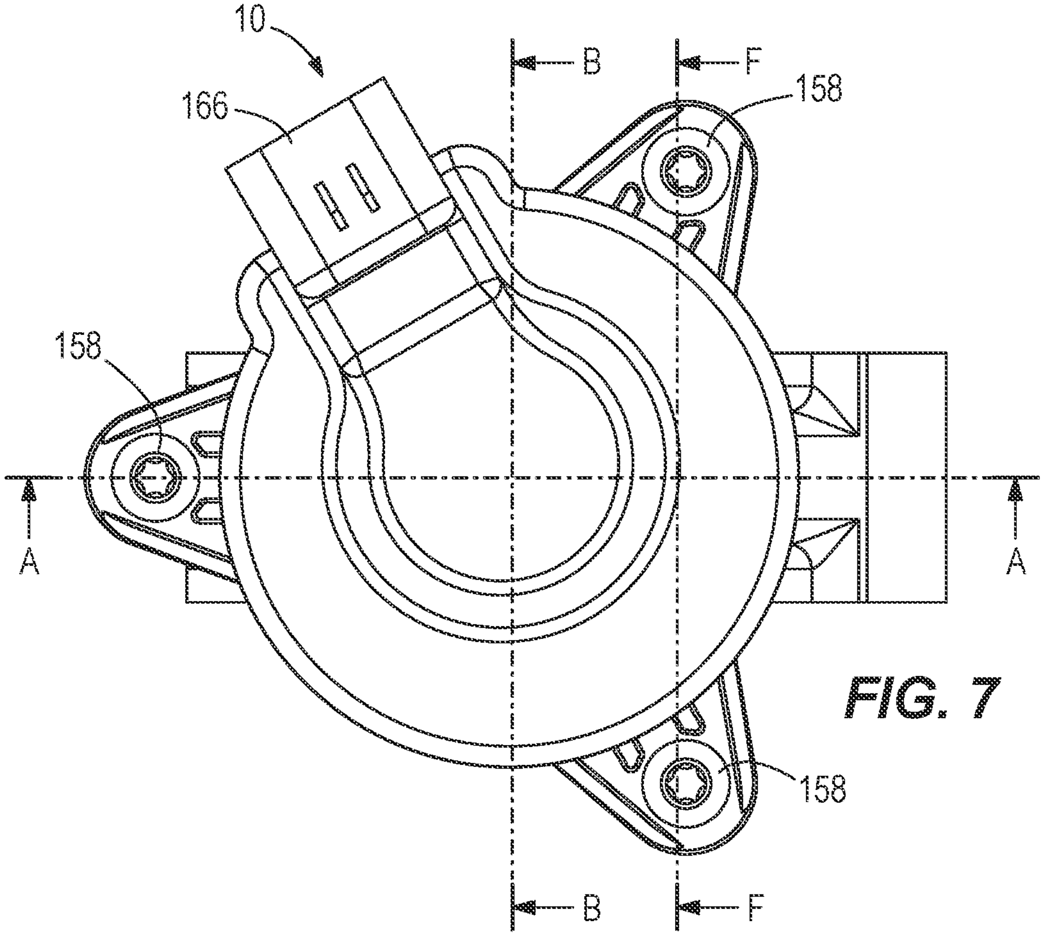
FIG. 7 is a top view of the valve assembly of FIG. 1.

Before any independent embodiments are explained in detail, it is to be understood that the disclosure is not limited in its application to the details of construction and the arrangement of components set forth in the following description or illustrated in the following drawings. The disclosure is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use, etc.) associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10% or more) of an indicated value.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

The embodiment(s) described below and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described.

FIGS. 1-7 illustrate a valve assembly 10, such as an exhaust gas recirculation (EGR) valve assembly and, specifically, a cold-side EGR valve assembly, operable to control exhaust flow to the engine intake (not shown), thereby controlling the air-to-fuel ratio and reducing engine emissions. In other constructions (not shown), the valve assembly 10 may be another type of valve assembly, for example, an exhaust brake valve assembly.

The valve assembly 10 includes a valve housing portion 14 defining a flow passage 18 through which gas flows along a flow path. A butterfly flap 22 is supported on a driven shaft 26 (at a flap end 27) for pivoting movement therewith between an open position, a closed position, in which gas flow is inhibited, and a plurality of intermediate flow positions. An opposite transmission end 28 of the driven shaft 26 (see FIG. 8) extends towards an actuator housing portion 30 in which a drive or actuator assembly 34 is housed.

With continued reference to FIGS. 1-7, the valve housing portion 14 includes a body 38 having a wall 42. The wall 42 defines the flow passage 18 which extends along a passage axis A1. A plurality of bosses 46 (three shown), each having an opening 50, are circumferentially spaced apart on the body 38. The illustrated openings 50 are provided on a common circle and receive respective fasteners (not shown) for mounting the Valve assembly 10 to an engine component such as an intake or exhaust manifold (not shown).

Figure 8:
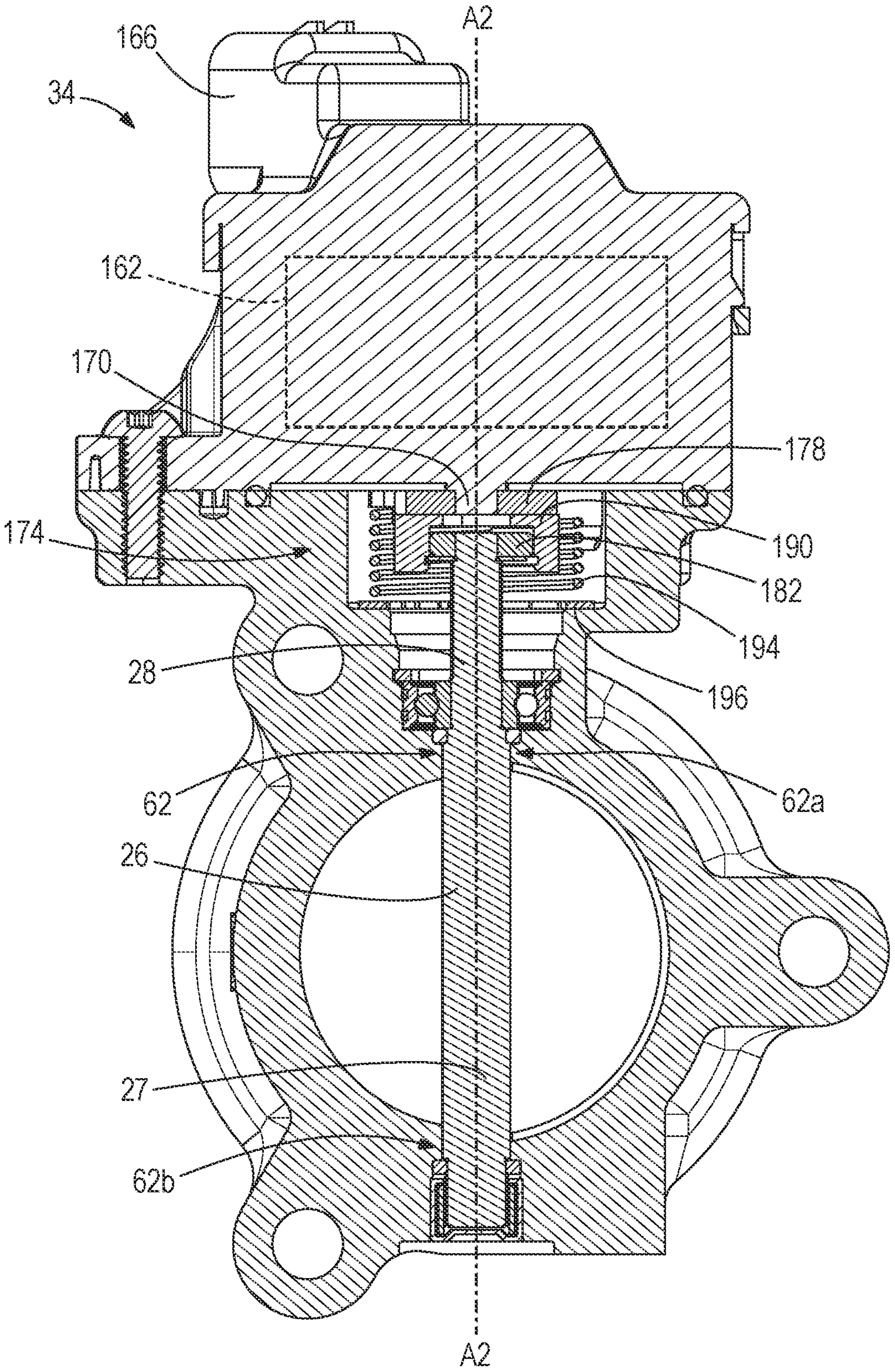
FIG. 8 is a front cross-sectional view of the valve assembly of FIG. 1, taken generally along the line A-A in FIG. 7.

As shown in FIG. 8, a bore 62, with portions 62*a*, 62*b* on opposite sides of the flow passage 18, is defined in the valve housing portion 14 in a direction transverse to the wall 42. The driven shaft 26, extending along a driven shaft axis A2, is pivotably supported in the bore 62.

Figure 9:
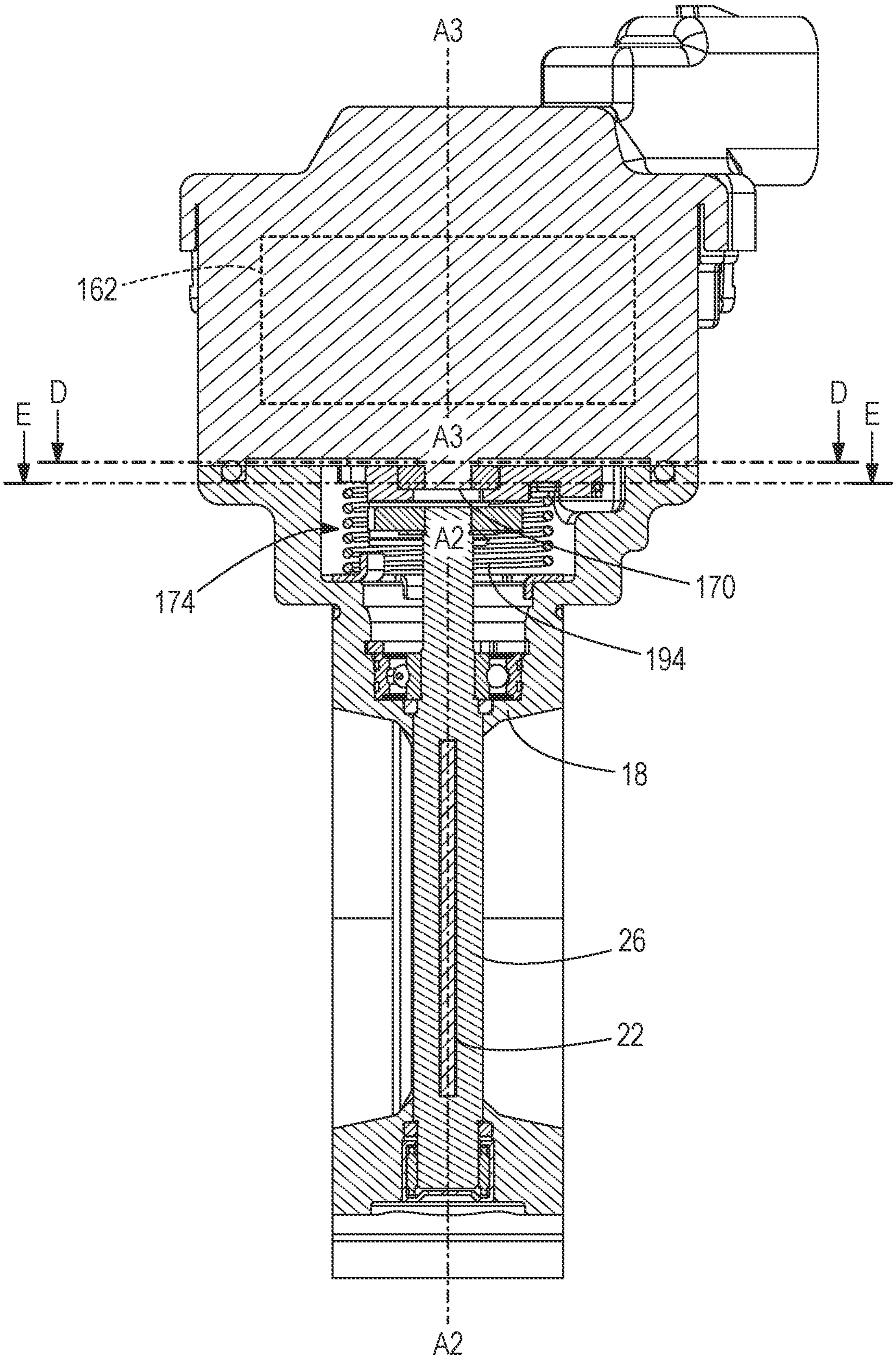
FIG. 9 is a side cross-sectional view of the valve assembly of FIG. 1, taken generally along the line B-B in FIG. 7.
Figure 10:
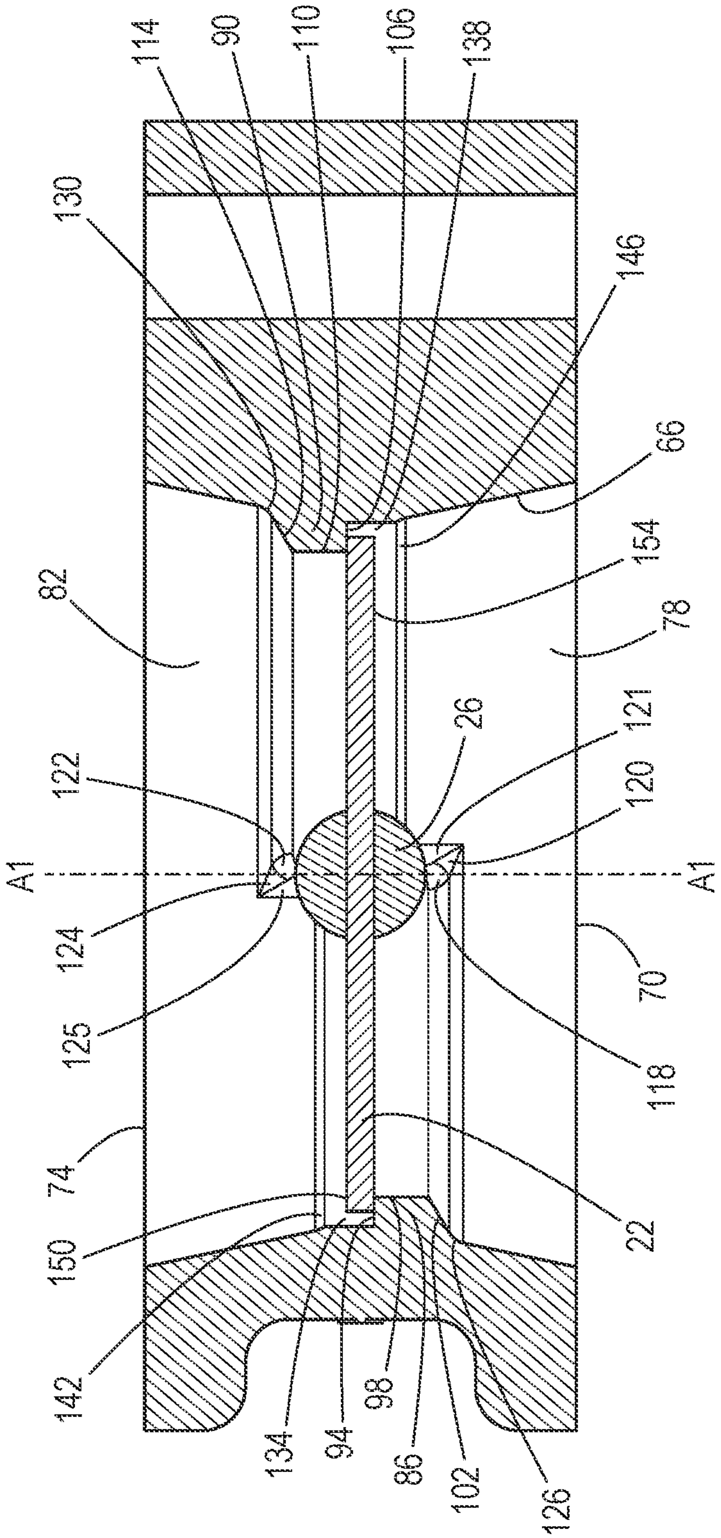
FIG. 10 is a top cross-sectional view of the valve assembly of FIG. 1, taken generally along the line C-C in FIG. 2.
Figure 11A:
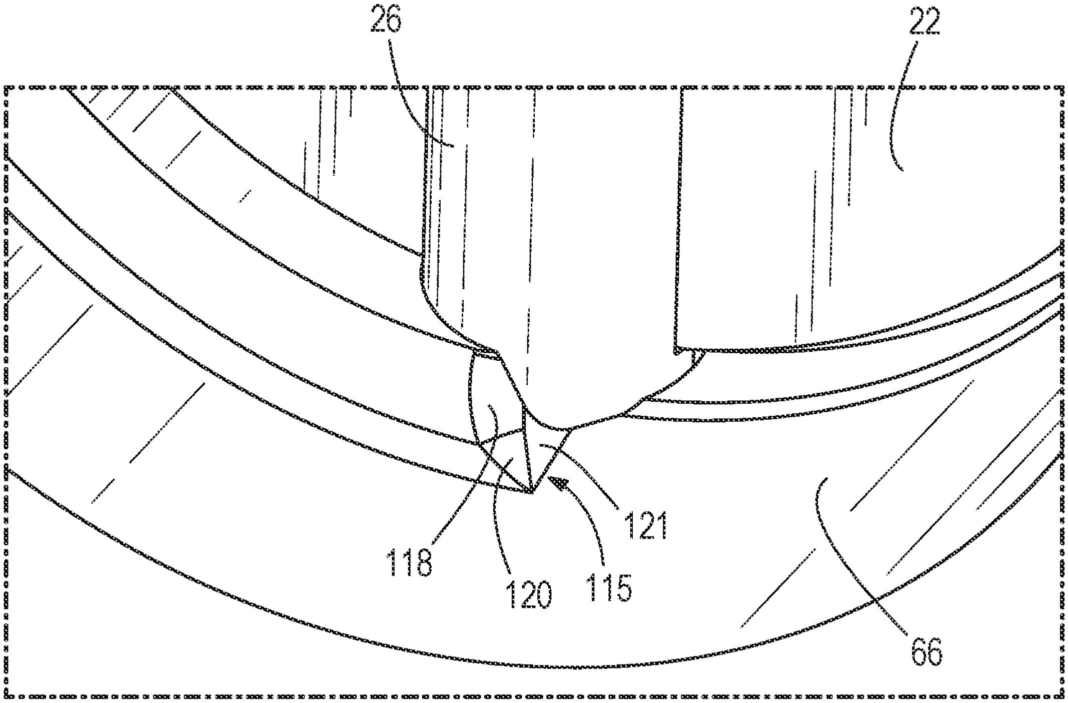
FIG. 11A is an enlarged perspective view of a portion of the valve assembly of FIG. 1, illustrating a tapered end of a sealing member.
Figure 11B:
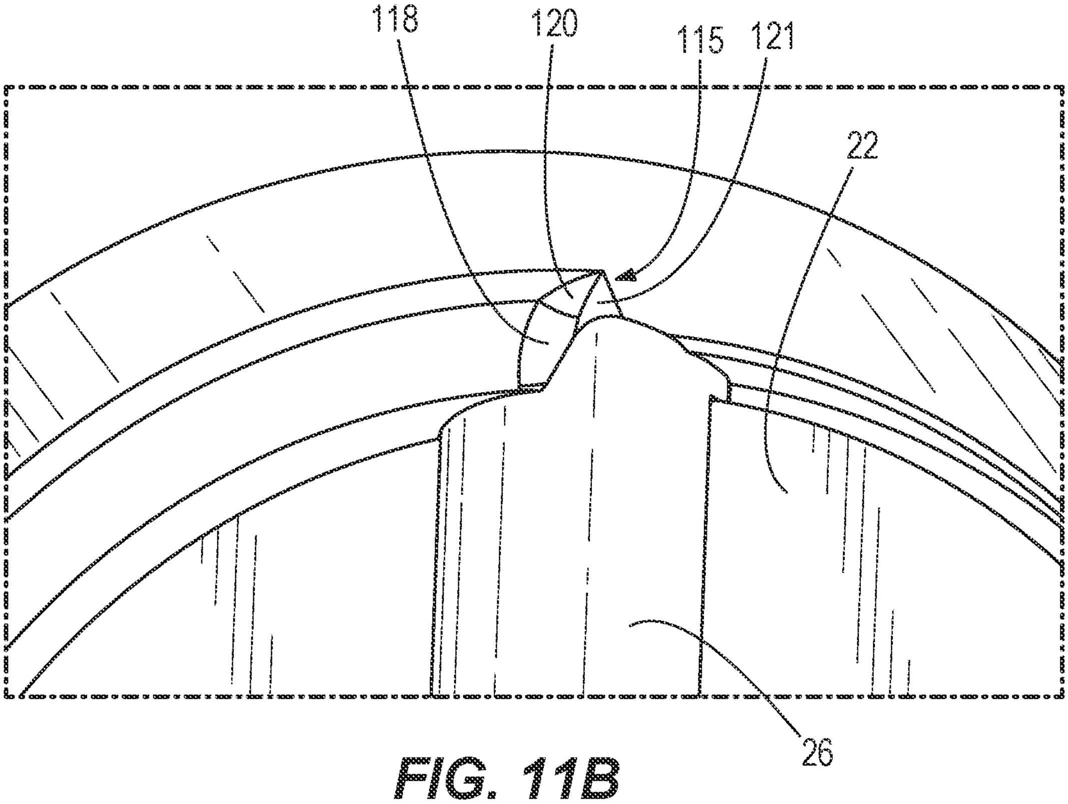
FIG. 11B is an enlarged perspective view of another portion of the valve assembly of FIG. 1, illustrating an opposite tapered end of a sealing member shown in FIG. 11A.
Figure 12A:
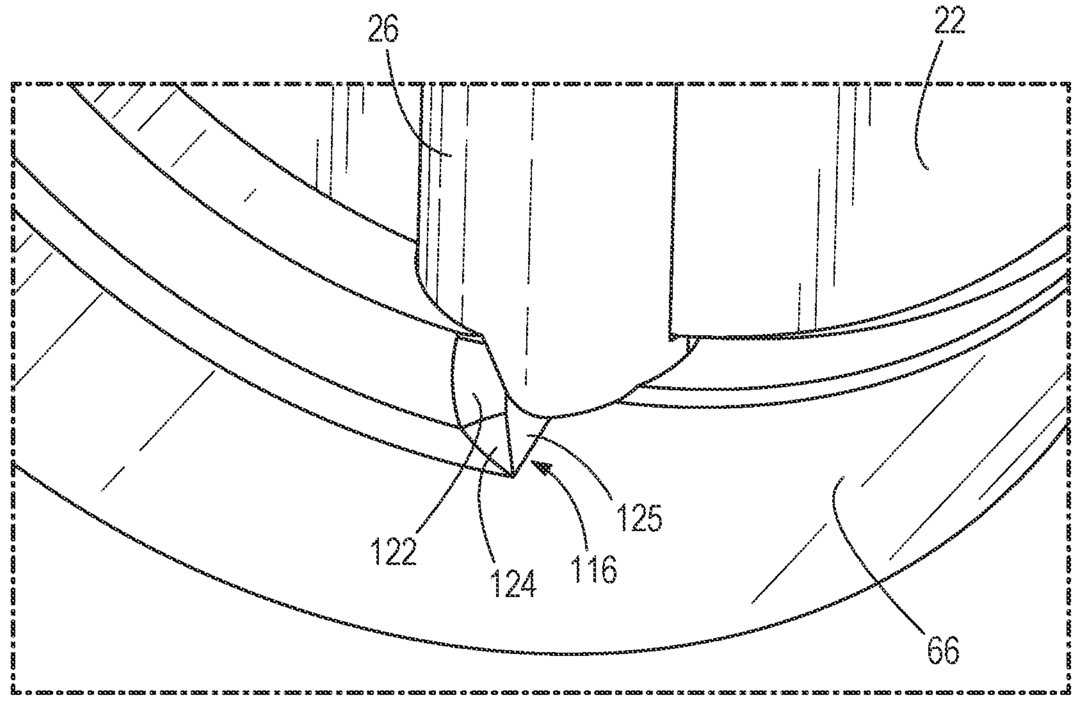
FIG. 12A is an enlarged perspective view of another portion of the valve assembly of FIG. 1, illustrating a tapered end of a sealing member.
Figure 12B:
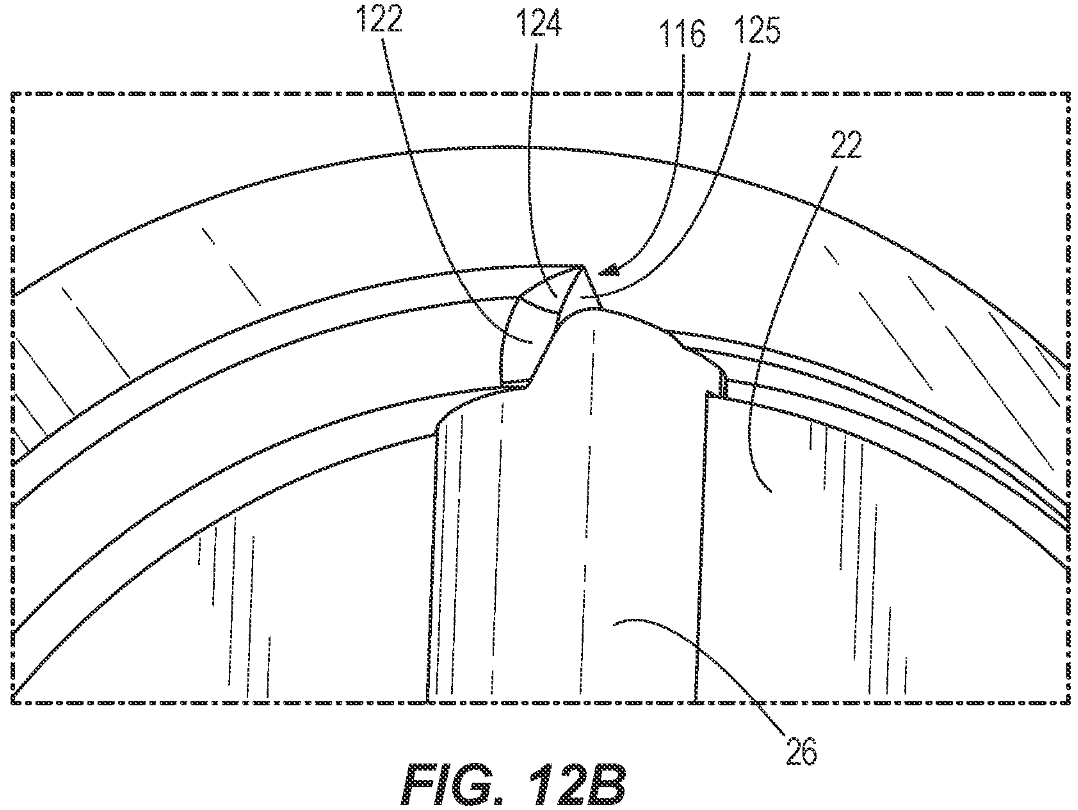
FIG. 12B is an enlarged perspective view of another portion of the valve assembly of FIG. 1, illustrating an opposite tapered end of a sealing member shown in FIG. 12A.

FIGS. 9-10 illustrate an inner surface 66 of the wall 42 shaped to direct the flow of exhaust gases between opposite ports (e.g., an inlet 70 and an outlet 74). An entrance surface 78 slopes inwardly from the inlet 70 toward the flap 22 and the driven shaft 26, and an exit surface 82 slopes outwardly from the flap 22 and the driven shaft 26 to the outlet 74. In other constructions (not shown), the inner surface 66 may be at least partially cylindrical along the passage axis A1.

Additionally, the inner surface 66 provides a surface against which the flap 22 is able to seal. With continued reference to FIGS. 9-10, the inner surface 66 includes an annular first sealing ridge 86 closer to the inlet 70 and an annular second sealing ridge 90 closer to the outlet 74. The first sealing ridge 86 has a sealing surface 94 shaped to sealingly mate with a first portion of the flap 22, a radially-inner flat surface 98 and an opposite surface 102 sloped away from the flap 22 and the driven shaft 26. The first sealing surface 94 has an annular seal face area.

With continued reference to FIGS. 9-10, the second sealing ridge 90 includes a sealing surface 106 shaped to sealingly mate with a second portion of the flap 22, a radially-inner flat surface 110 and an opposite surface 114 sloped away from the flap 22 and the driven shaft 26. The sealing surface 106 has an annular seal face area. The sealing ridges 86, 90, along with the sealing surfaces 94, 106, the flat surfaces 98, 110, and the opposite surfaces 102, 114, curve about the passage axis A1.

With reference to FIGS. 11A-12B, each sealing ridge 86, 90 terminates in opposite tapered ends 115, 116, respectively. In the illustrated construction, the tapered ends 115, 116 are identical. Each tapered end 115, 116 includes a sloped end 118, 122, a pointed end 120, 124, and a terminal end 121, 125, each being angled away from the bore 62.

With continued reference to FIG. 10, a first chamfered surface 126 transitions the surface 102 into the inlet surface 78, and a second chamfered surface 130 transitions the surface 114 into the outlet surface 82. A radially-outer flat surface 134 is positioned adjacent to the first sealing ridge 86 and surrounds a portion of the flap 22 when the flap 22 is in the closed position, and a radially-outer flat surface 138 is positioned adjacent to the second sealing ridge 90 and surrounds an opposite portion of the flap 22 when the flap 22 is in the closed position. A third chamfered surface 142 transitions the flat surface 134 to the outlet surface 82, and a fourth chamfered surface 146 transitions the flat surface 138 to the inlet surface 78.

In operation, exhaust gases flow through the inlet 70, along the flow passage 18, and through the outlet 74. When the flap 22 is in the open position and, more particularly, in a fully open position, the flow is at a maximum. The exhaust gases flow over the sealing ridges 86, 90, and flow around the flap 22 and around the driven shaft 26. When the flap 22 is in the closed position, the flap 22 engages the sealing surfaces 94, 106 to at least substantially block and prevent the flow of exhaust gases through the flow passage 18.

The exhaust gases may contain water vapor, particles, and other impurities. As exhaust gases flow through the flow passage 18, deposits, such as condensate, "coke", "gunk", soot, and other matter may form on the inner surface 66. If deposits form on the sealing ridges 86, 90, the flap 22, the driven shaft 26, the bore 62, etc., sealing efficiency and movement of the flap 22 and the shaft 26 may be inhibited. Sloped surfaces within the flow passage 18 (e.g., the opposite surfaces 102, 114, the tapered ends 115, 116, etc.) cause deposits to flow away from locations (e.g., the sealing surfaces 94, 106, the bore 62) where deposits may inhibit sealing efficiency.

Figure 13:
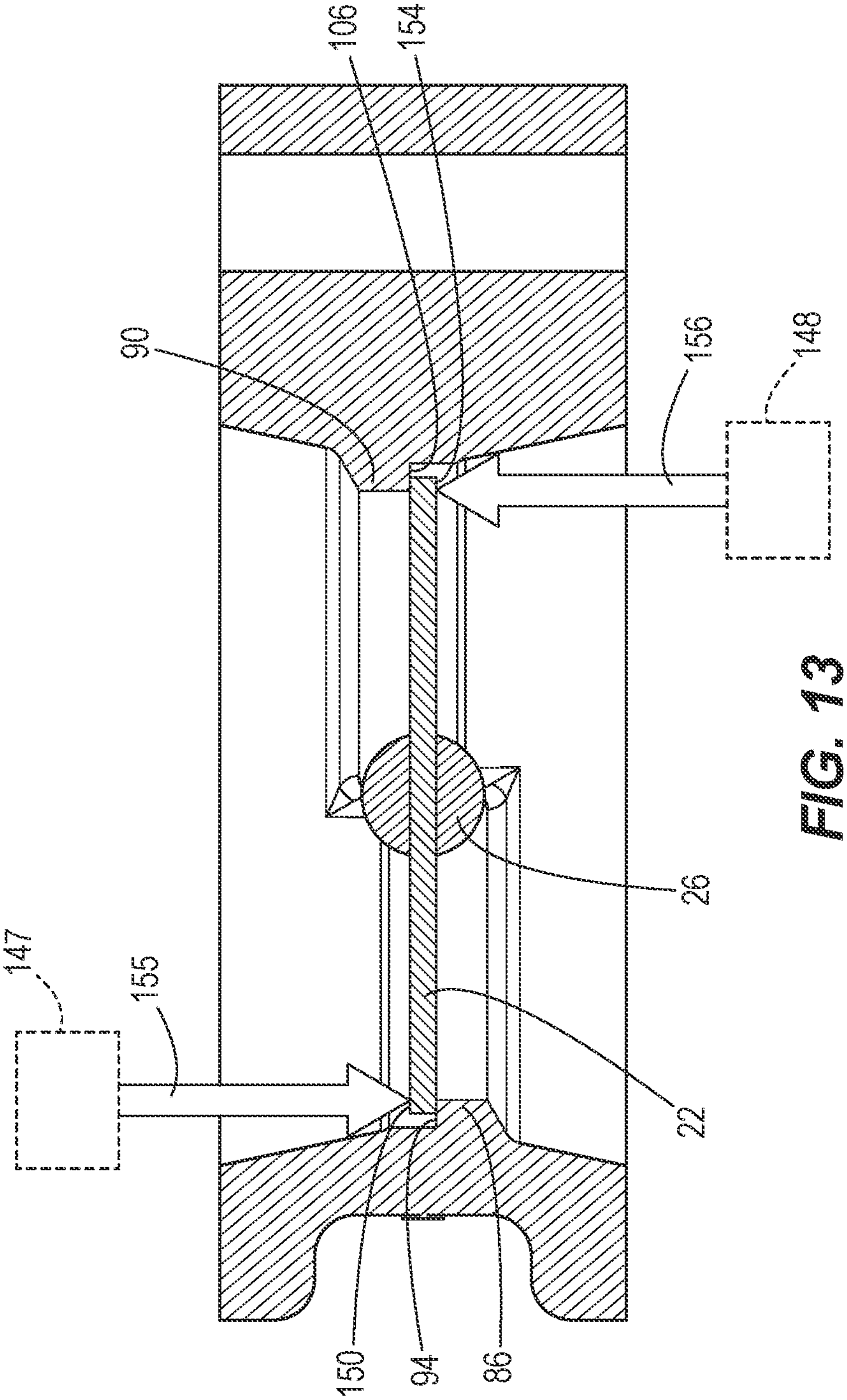
FIG. 13 is a schematic diagram of a method of manufacturing a valve assembly, such as the valve assembly of FIG. 1, illustrating a coining process.

FIG. 13 schematically illustrates a process for coining the flap 22 and the sealing surfaces 94, 106 of the valve assembly 10. Coining may provide a valve assembly 10 with a flap 22 having a precise, "custom" fit with the sealing surfaces 94, 106 as they have been formed in the valve housing portion 14 and vice versa.

In the manufacturing process, the flap 22 is supported on the shaft 26 in the flow passage 18 and engaged with the sealing surfaces 94, 106. A first ram 147 is inserted into the inlet 70 and pressed against a first side 150 of the flap 22 opposite the sealing surface 94, while a second ram 148 is inserted into the outlet 74 and pressed against a second side 154 of the flap 22 opposite the sealing surface 106. The rams 147, 148 apply force 155, 156 to the opposite sides 150, 154 of the flap 22 (e.g., on opposite sides of a driven shaft 26) to coin or cold forge the flap 22 against the first sealing surface 94 and against the second sealing surface 106. As a result, the flap 22 conforms to contours of the sealing surfaces 94, 106, and vice versa.

With continued reference to FIG. 13, the first ram 147 has a first ram area, and the first sealing surface 94 defines a first seal face area. The second ram 148 has a second ram area, and the second sealing surface 106 defines a second seal face area. In the illustrated construction, the first ram area is greater than the first seal face area, and the second ram area is greater than the second seal face area.

Each force 155, 156 is greater than about 4,000 pound-force (lbf) and up to about 12,000 lbf. More particularly, each force is greater than about 7,000 lbf and up to about 9,000 lbf (e.g., about 8,000 lbf). In the illustrated process, the forces 155, 156 are substantially equal and are applied simultaneously. The forces 155, 156 are applied for at least one second (s) and up to about 20 s (e.g., in the illustrated embodiment, about 5 s).

With reference to FIGS. 1 and 8-9, the actuator housing portion 30 is mounted to the valve housing portion 14 by screws 158. The actuator assembly 34 includes an electric motor 162 (schematically illustrated; e.g., a brushless DC motor) positioned within the actuator housing portion 30. An electrical connector 166 provides electrical power and communication signals to the motor 162. Electrical and control components (not shown), such as, for example, a controller (including an electronic processor), a motor controller, a printed circuit board, one or more sensors, etc., are also housed in the actuator housing portion 30.

Figure 14:
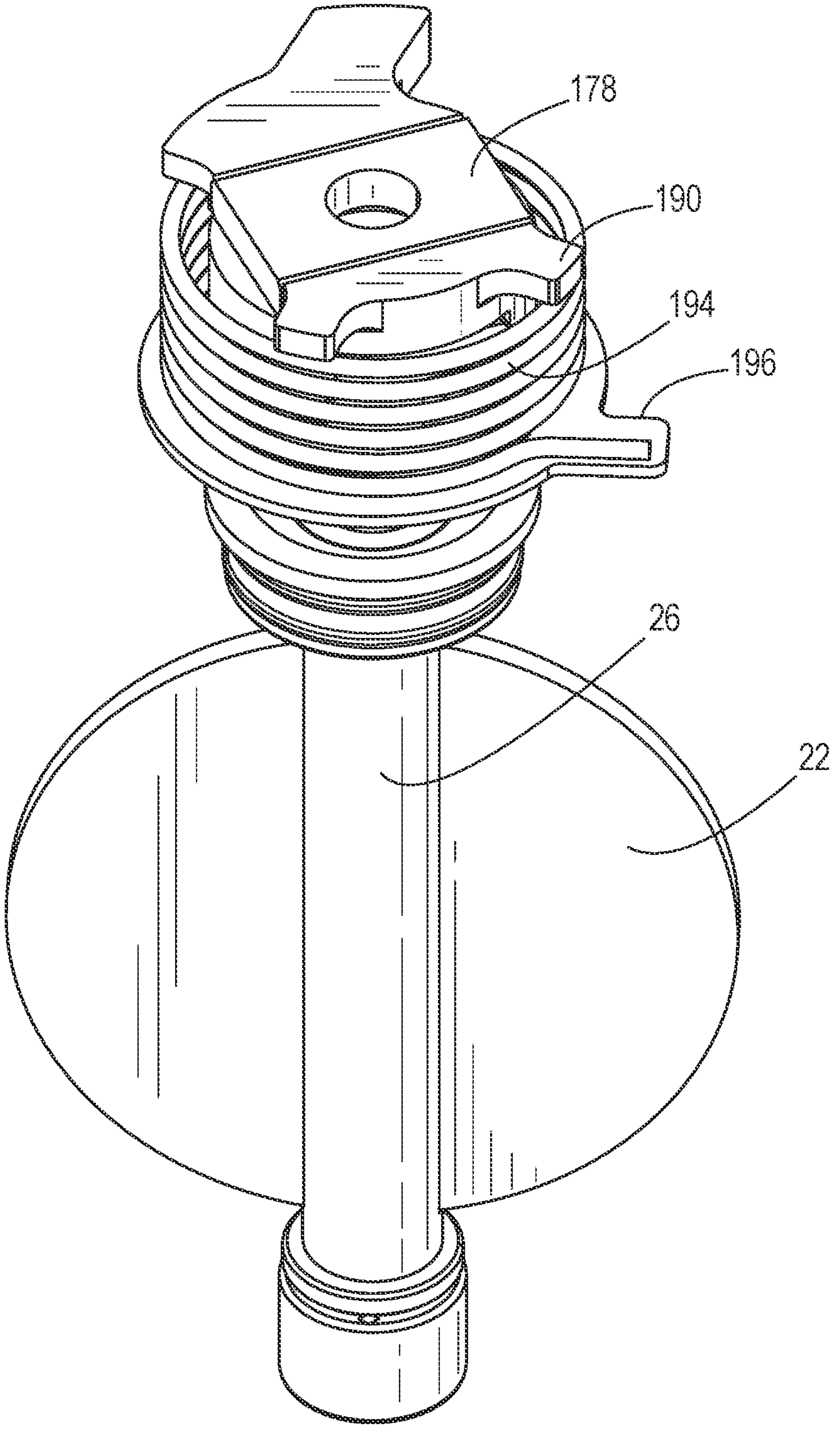
FIG. 14 is a perspective view of a portion of the valve assembly of FIG. 1, illustrating a spider assembly, a driven shaft, and a flap.
Figure 15:
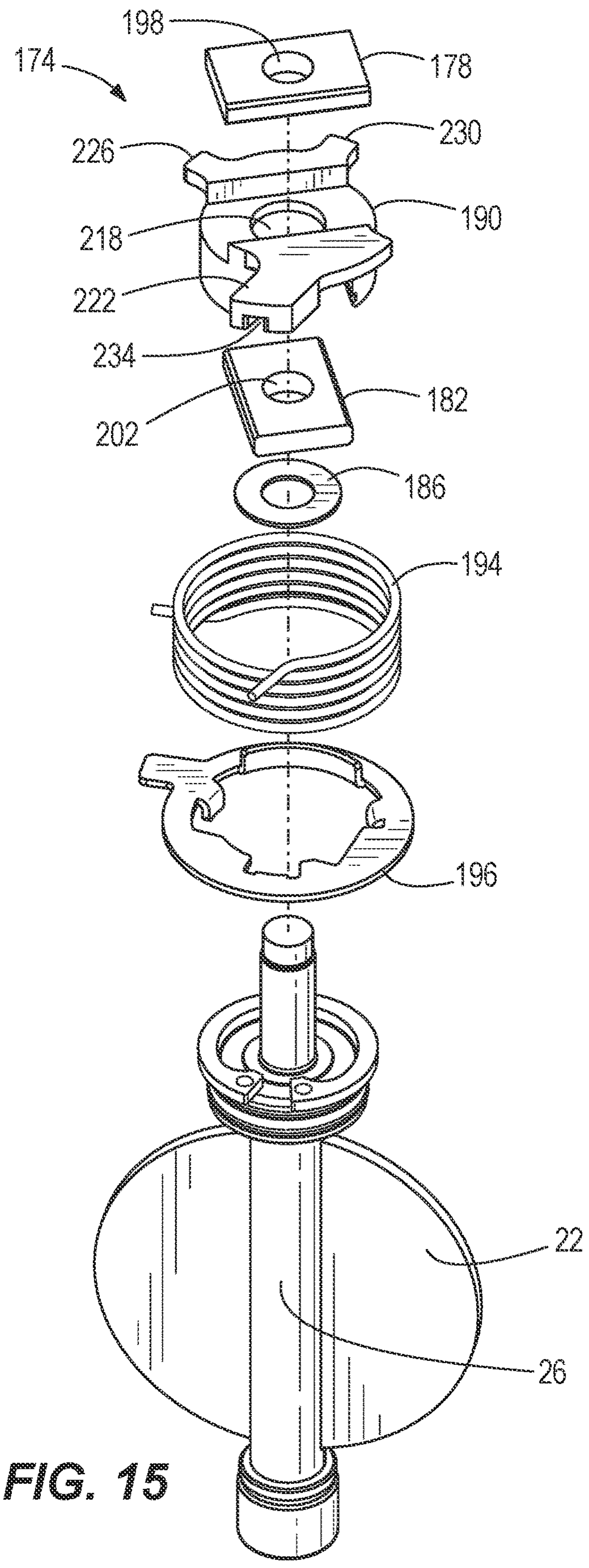
FIG. 15 is an exploded view of the portion of the valve assembly shown in FIG. 14.
Figure 16:
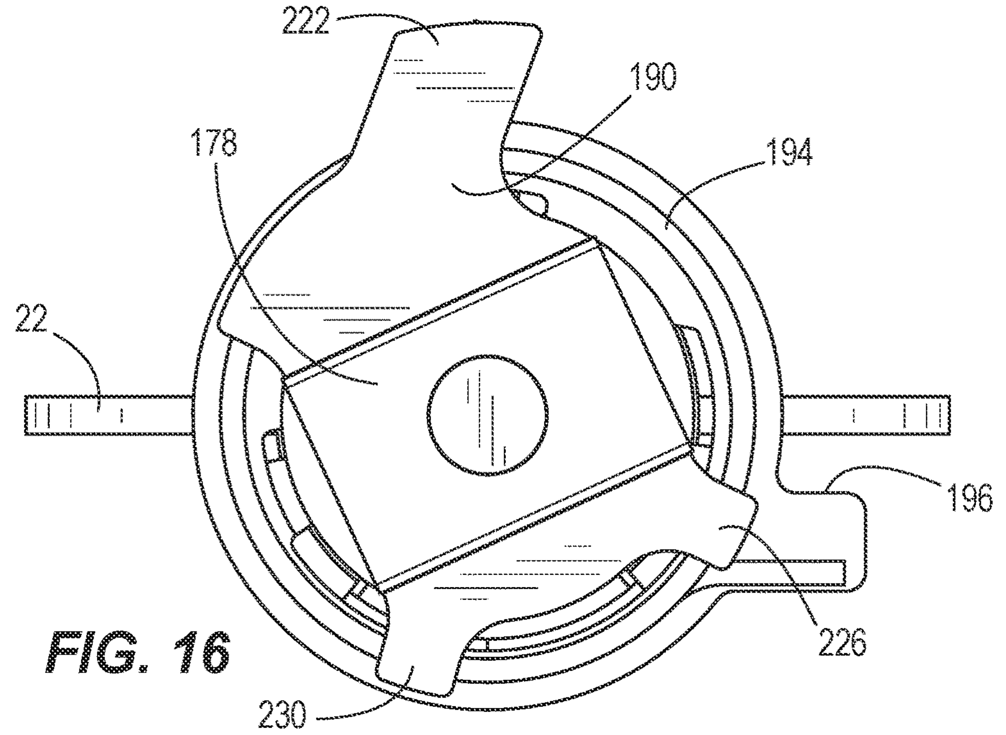
FIG. 16 is a top view of the spider assembly shown in FIG. 14.
Figure 17:
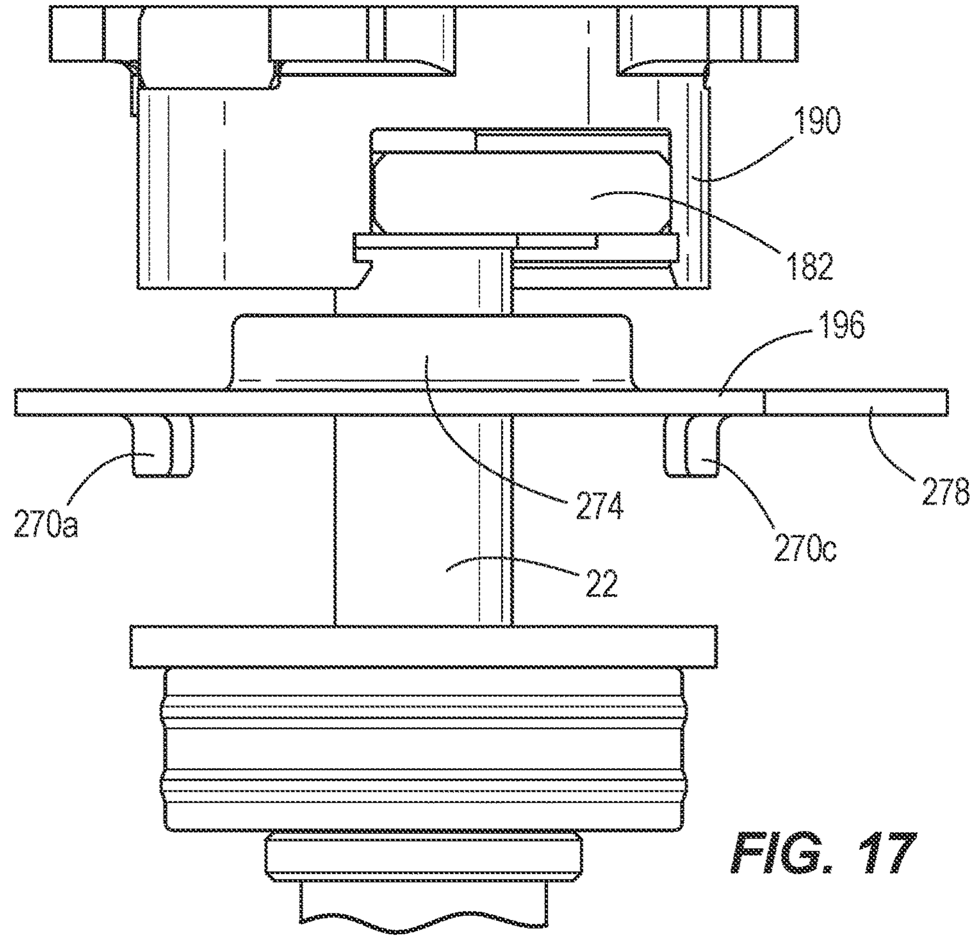
FIG. 17 is a side view of the spider assembly and the driven shaft shown in FIG. 14, with a torsion spring removed.
Figure 19:
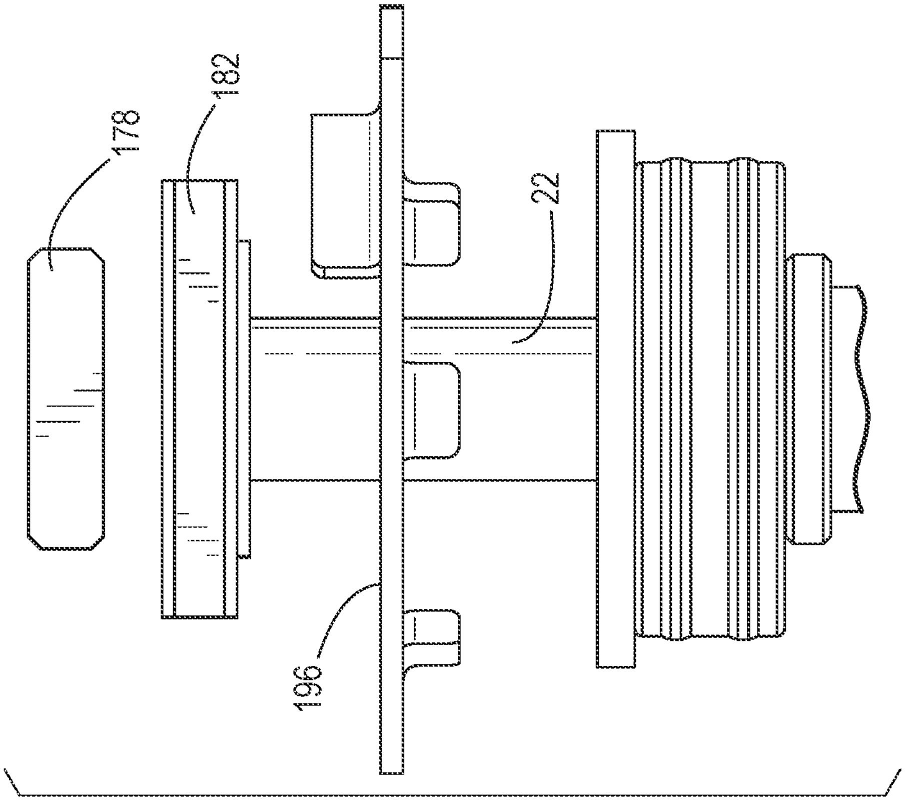
FIG. 19 is another side view of the portion of the spider assembly and the driven shaft as shown in FIG. 18.
Figure 18:
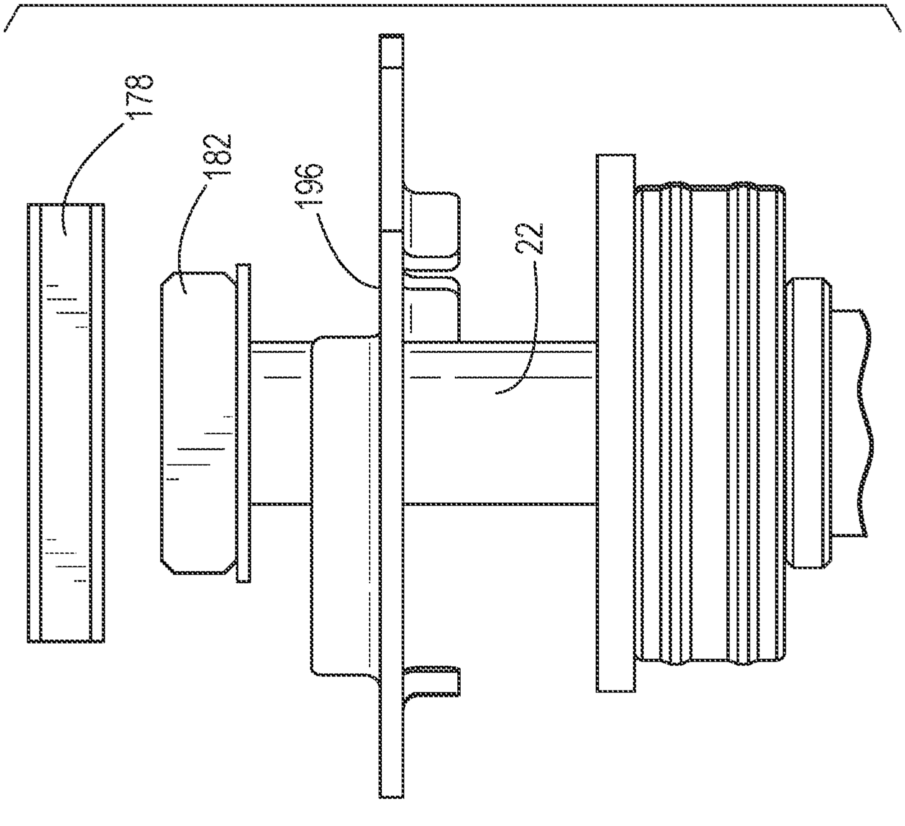
FIG. 18 is a side view of the spider assembly and the driven shaft shown in FIG. 14, with the spring and the spider member removed.
Figure 20:
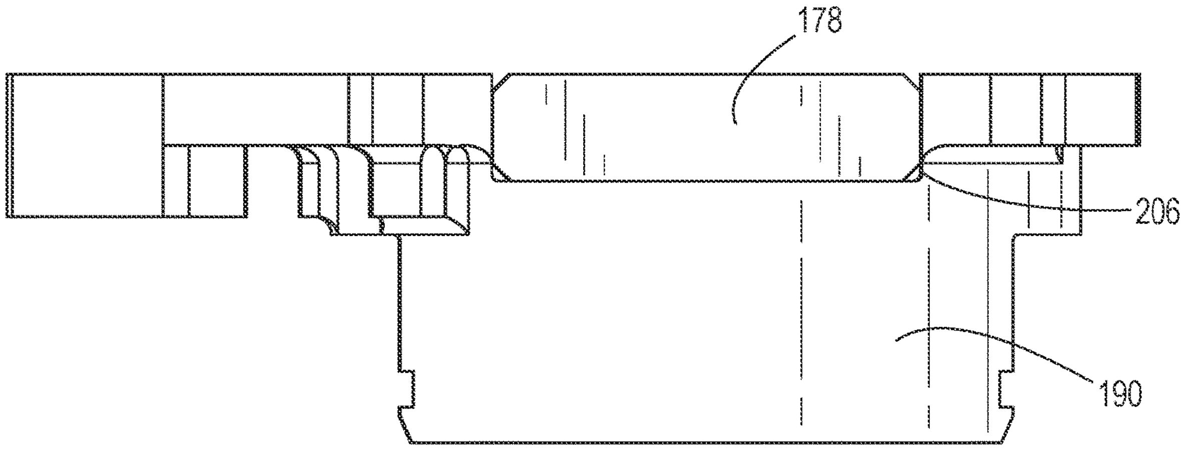
FIG. 20 is a side view of the spider member and a drive bowtie shown in FIG. 15.

The electric motor 162 includes a pivoting drive shaft 170 defining a drive shaft axis A3. In some embodiments, the drive shaft axis A3 not be collinear with the driven shaft axis A2. A spider assembly 174 (see FIGS. 8 and 14-15) drivingly connects the drive shaft 170 to the driven shaft 26 and may accommodate misalignment between the axes A2, A3. The spider assembly 174 generally includes (see FIGS. 14-15) a drive bowtie 178, a driven bowtie 182, a plate 186, a spider member 190, a torsion spring 194, and a spring holder 196.

As shown in FIGS. 14-19, the drive bowtie 178 defines an opening 198 proximate its center for coupling to the drive shaft 170. The driven bowtie 182 defines an opening 202 proximate its center for coupling to the driven shaft 26. In other constructions (not shown), the bowties 178, 182 may be integrally formed with or coupled to the shafts 170, 26 via other methods.

With reference to FIGS. 14-24, the spider member 190 defines a first slot 206 configured to receive and allow sliding movement of the drive bowtie 178 along the slot 206 while restraining transverse movement of the bowtie 178. Similarly, the spider member 190 defines a second slot 210 configured and allow sliding movement of the driven bowtie 182 along the slot 210 while restraining transverse movement of the bowtie 182. In the illustrated construction, the slots 206, 210 are oriented transverse (e.g., substantially perpendicular) to each other such that the bowtie 178, 182 are slidable transverse (e.g., substantially perpendicular) to each other. The misalignment of the axes A2, A3 is accommodated by sliding movement of the bowties 178, 182 and the respective shafts 170, 26.

Figure 21:
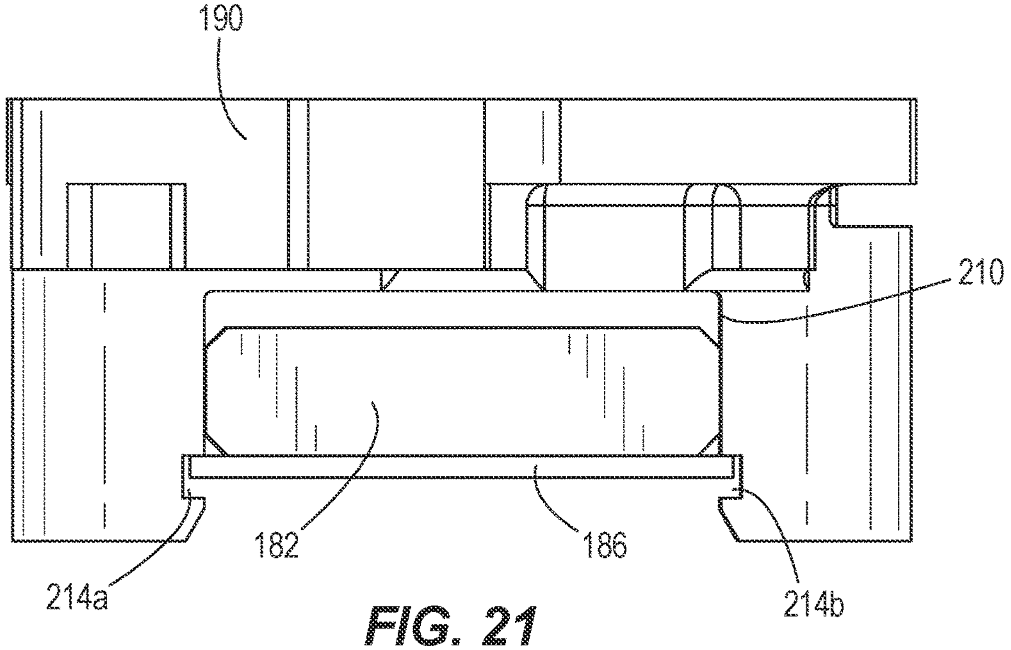
FIG. 21 is a side view of the spider member, a driven bowtie, and a plate shown in FIG. 15.
Figure 23:
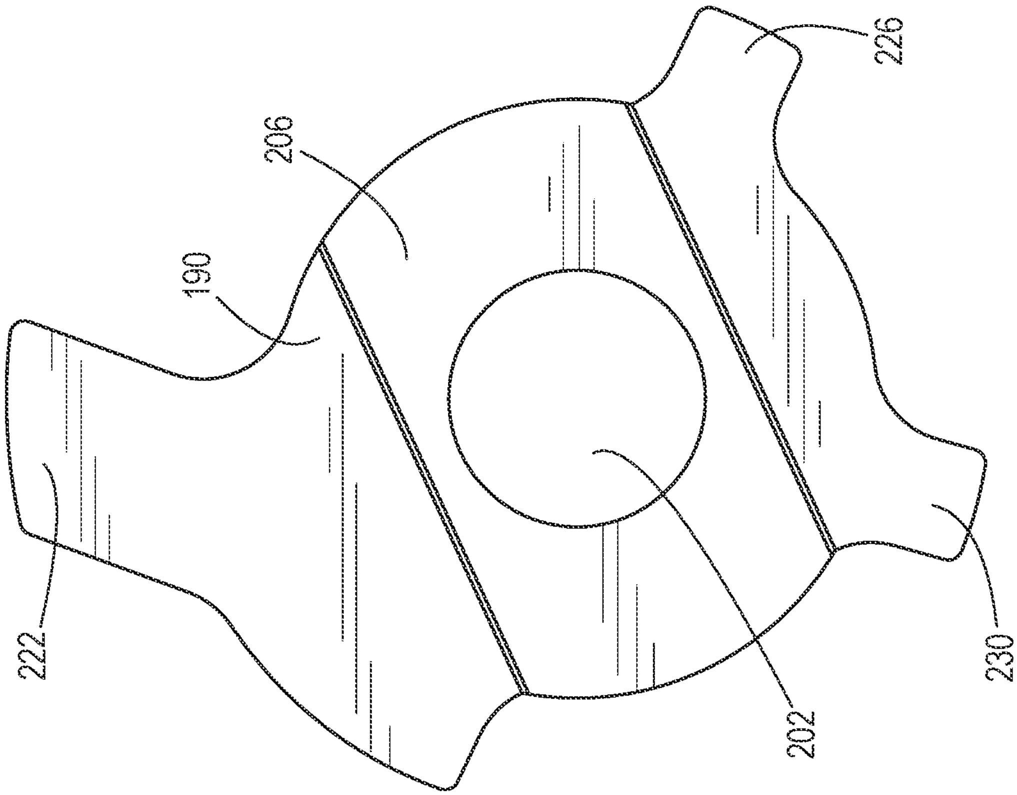
FIG. 23 is a top view of the spider member shown in FIG. 15.

As shown in FIG. 21, opposed slots 214*a*, 214*b*, defined on opposite sides of the second slot 210, are configured to receive the plate 186 and retain the driven bowtie 182 in the slot 210. The plate 186 defines an opening receiving the driven shaft 26. The spider member 190 defines an axial opening 218 at least roughly aligned with shafts 170, 26.

Figure 22:
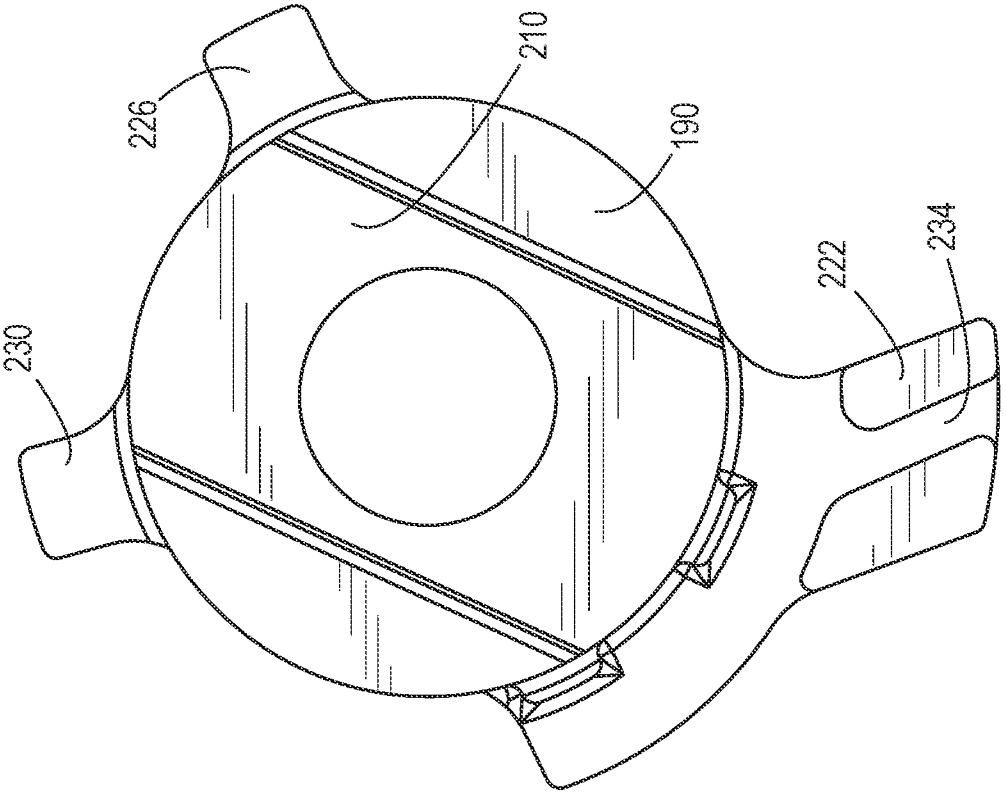
FIG. 22 is a bottom view of the spider member shown in FIG. 15.
Figure 25:
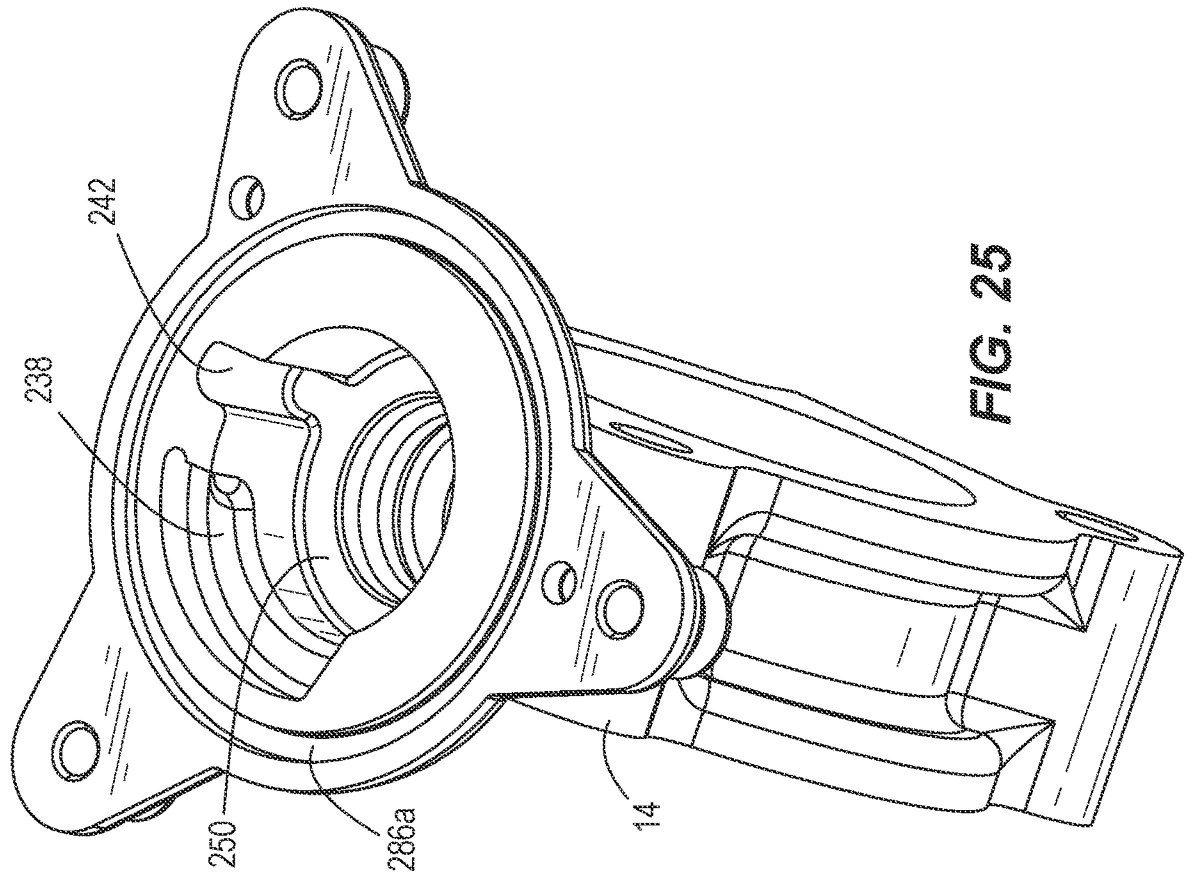
FIG. 25 is a perspective view of a valve housing portion of the valve assembly of FIG. 1.
Figure 24:
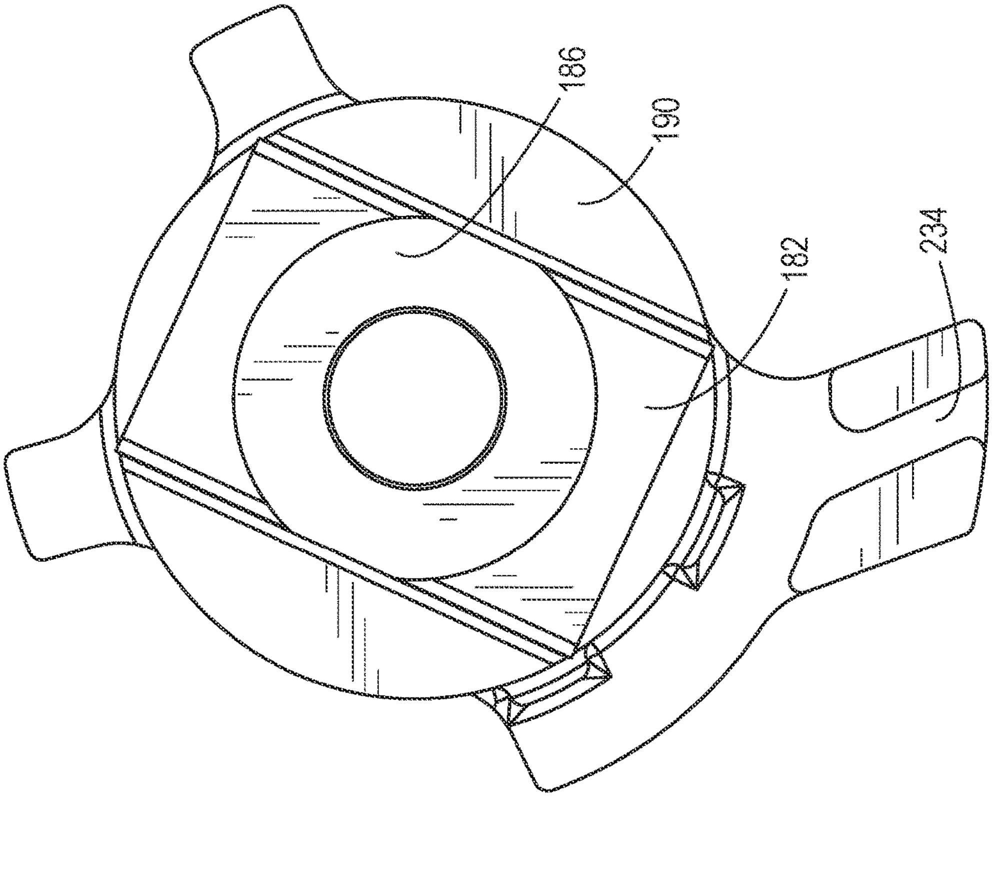
FIG. 24 is a bottom view of the spider, the drive bowtie, and the plate shown in FIG. 21.

As shown in FIG. 22, the spider member 190 includes circumferentially-spaced protrusions 222, 226, 230 on a side of the spider member 190 near the first slot 206. The protrusion 222 defines a notch 234 facing toward the driven shaft 26.

Figure 26:
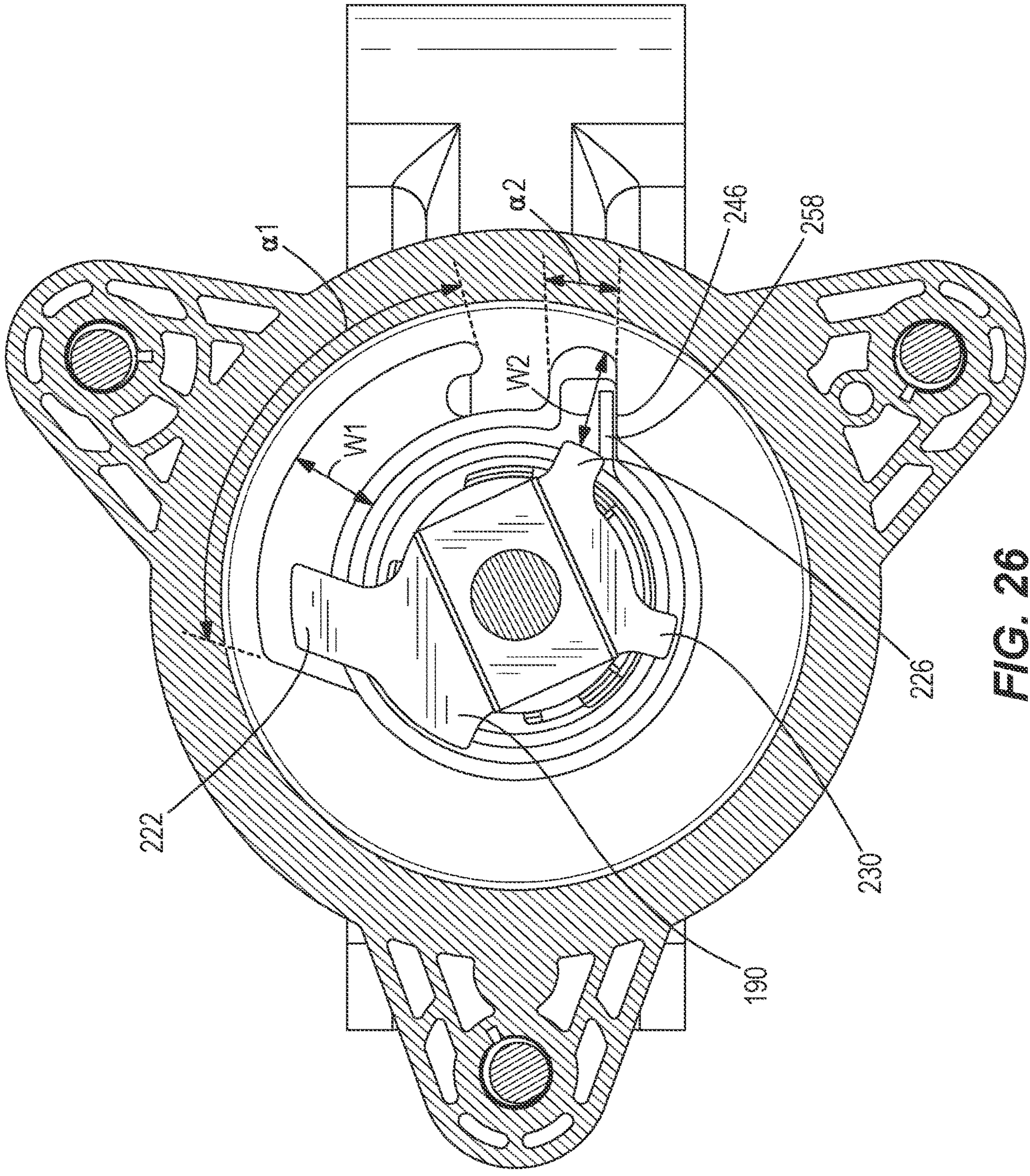
FIG. 26 is a top cross-sectional view of the valve assembly of FIG. 1, taken generally along the line D-D in FIG. 9.
Figure 27:
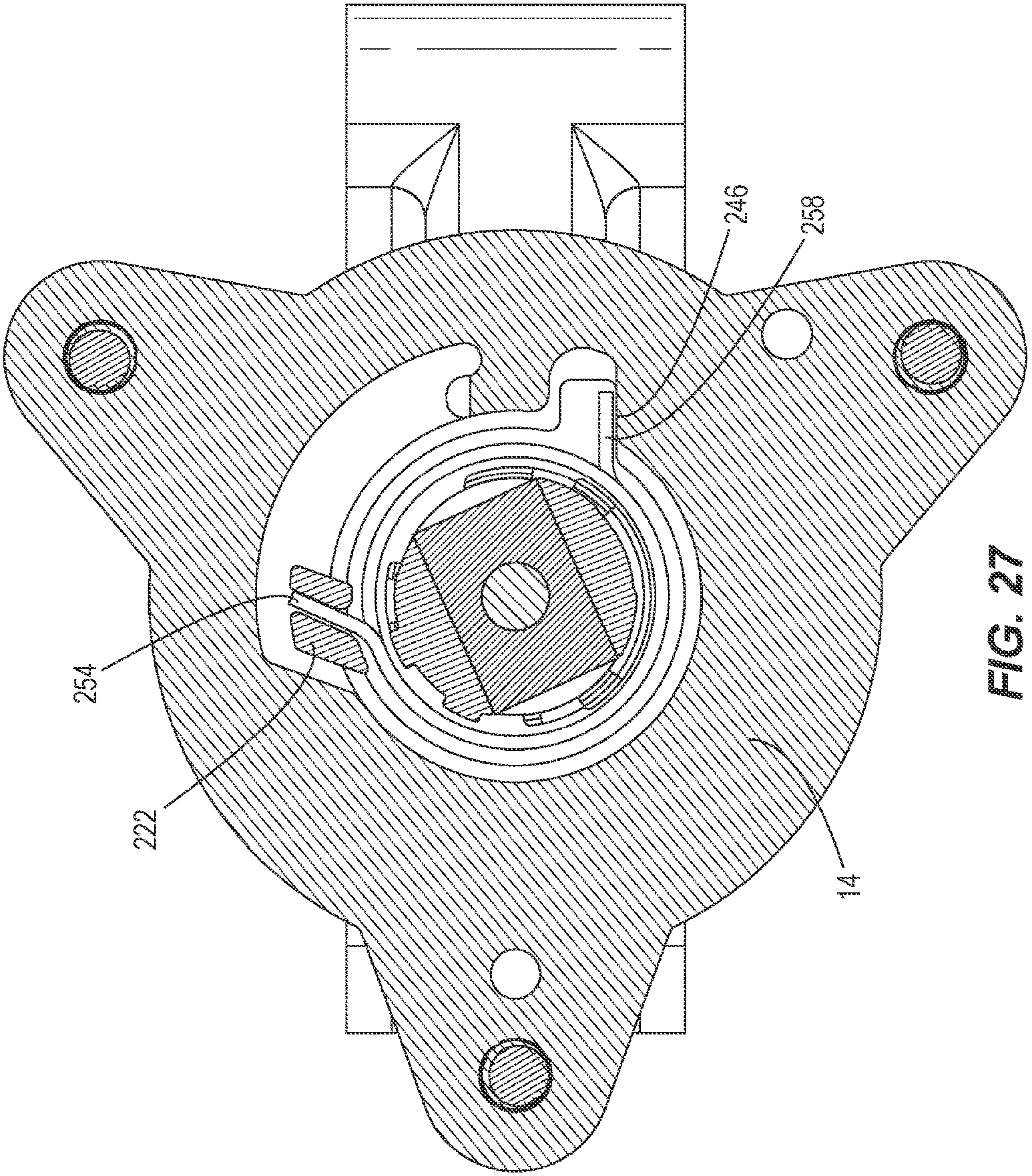
FIG. 27 is a top cross-sectional view of the valve assembly of FIG. 1, taken generally along the line E-E in FIG. 9.
Figure 28:
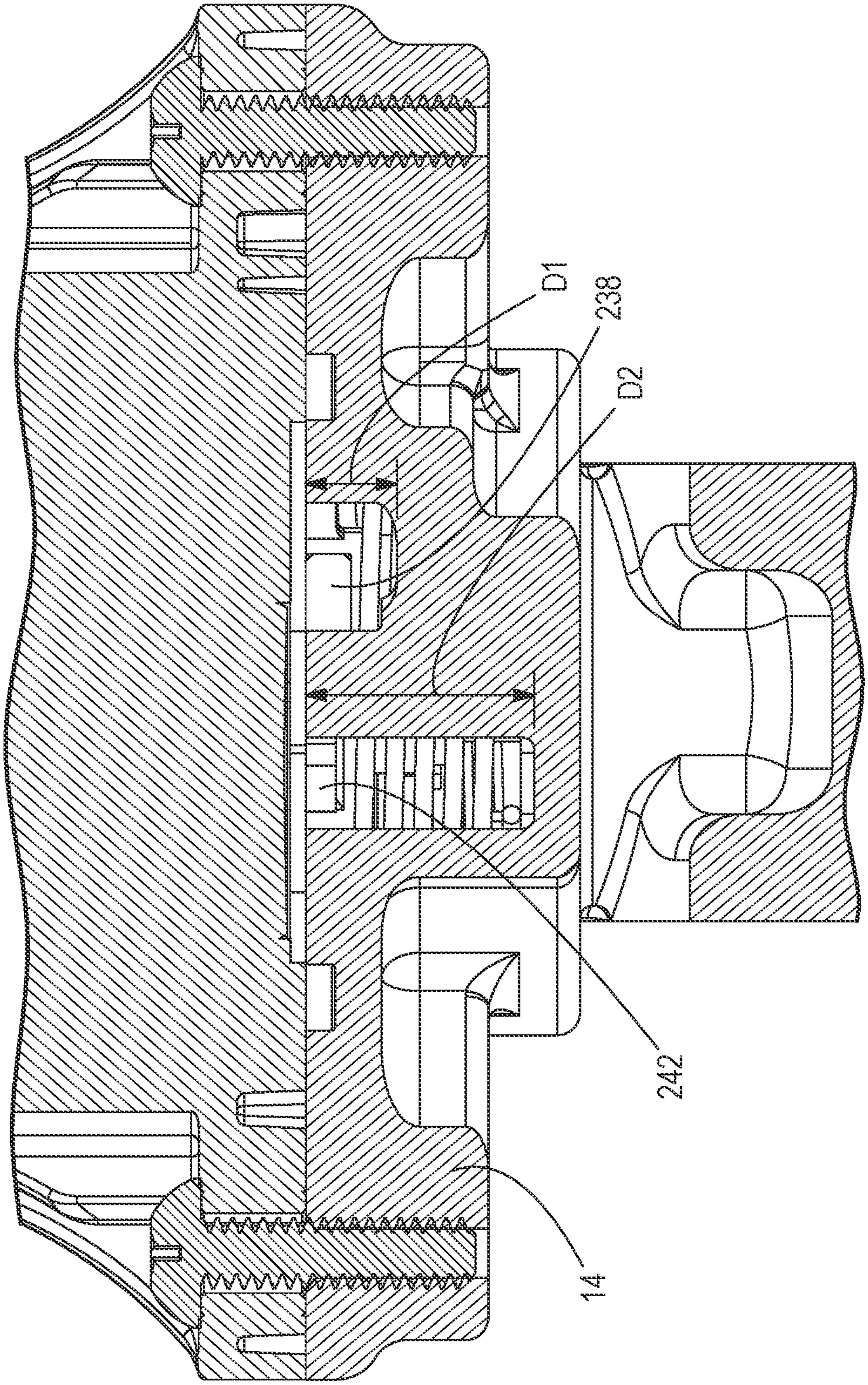
FIG. 28 is a partial cross-sectional view of the valve assembly of FIG. 1, taken generally along the line F-F in FIG. 7.

With reference to FIGS. 25-28, the valve housing portion 14 defines a first recess 238 and a second recess 242 spaced circumferentially with respect to the driven shaft axis A2. The first recess 238 has a depth D1 (FIG. 28) and a width W1 (FIG. 26) and subtends an angle α1 (FIG. 27). The angle α1 may be greater than about 45° and less than about 135° and, more particularly, approximately equal to a quarter-turn (e.g., about 70°, as shown). The second recess 242 is a notch having a depth D2 (FIG. 28) and a width W2 (FIG. 26; e.g., about 6 millimeters (mm)) sufficient to constrain the end 258 of the spring 194, as discussed below.

A spring bearing surface 246 is defined on an interior side of the second recess 242 (e.g., on a clockwise side of the second recess 242 when viewed in FIGS. 26-27). A ledge 250 circumferentially surrounds the bore 62 and faces towards the actuator housing portion 30.

The spring 194 interfaces between the spider member 190 and the valve housing portion 14 in order to pivotably bias the spider assembly 174 and, more specifically, the spider member 190, the driven bowtie 182, and the driven shaft 26, in a direction corresponding to the closed position of the flap 22. As shown in FIG. 27, a first end 254 of the spring 194 engages the spider member 190 (e.g., engaging within the notch 234 in the first protrusion 222), and a second end 258 engages the valve housing portion 14 (e.g., within the second recess 242, bearing against the spring bearing surface 246). The spring 194 biases the spider member 190 and, therefore, the spider assembly 174, in a counterclockwise direction (when viewed in FIG. 27). The spring 194 is configured to bias the flap 22 into the closed position (as mentioned above) and to take up (that is, inhibit or eliminate) lash in the spider assembly 174.

With reference to FIGS. 8 and 26, the spring holder 196 is positioned between the ledge 250 and the spring 194. The illustrated spring holder 196 is formed of austenitic steel, which may provide, for example, friction reduction, reduced debris creation, compatibility with material of the spring 194, etc.

Figure 29:
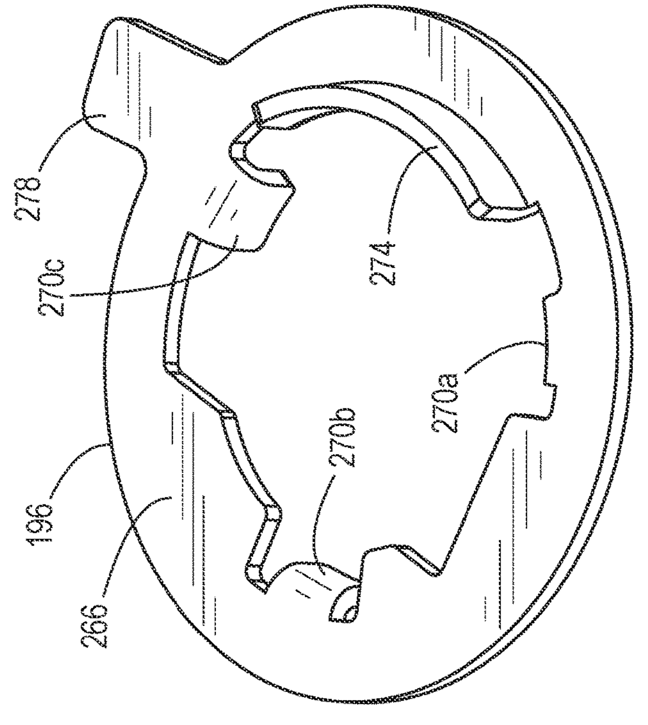
FIG. 29 is a perspective view of a spring holder shown in FIG. 15.

The spring holder 196 includes (see FIG. 29) a generally flat and circumferential flange 266 from which centering projections 270*a*, 270*b*, 270*c* protrude. The centering projections 270*a*, 270*b*, 270*c* are oriented at approximately 90° relative to the flange 266 and extend into the bore 62 when the spring holder 196 is positioned in the valve housing portion 14.

A spring positioning projection 274 protrudes from the flange 266 in a direction opposite to the centering projections 270*a*, 270*b*, 270*c*. The spring positioning projection 274 is oriented at approximately 90° relative to the flange 266 and engages an inner surface of the spring 194 when the spring holder 196 is in position in the spider assembly 174 to position the spring 194 relative to the spring holder 196 and relative to the valve housing portion 14. An orienting projection 278 extends radially from the flange 266 and, as illustrated, is configured (e.g., sized, shaped, etc.) to fit within the second recess 242 of the valve housing portion 14 to orient the spring holder 196 relative to the valve housing portion 14.

Figure 30:
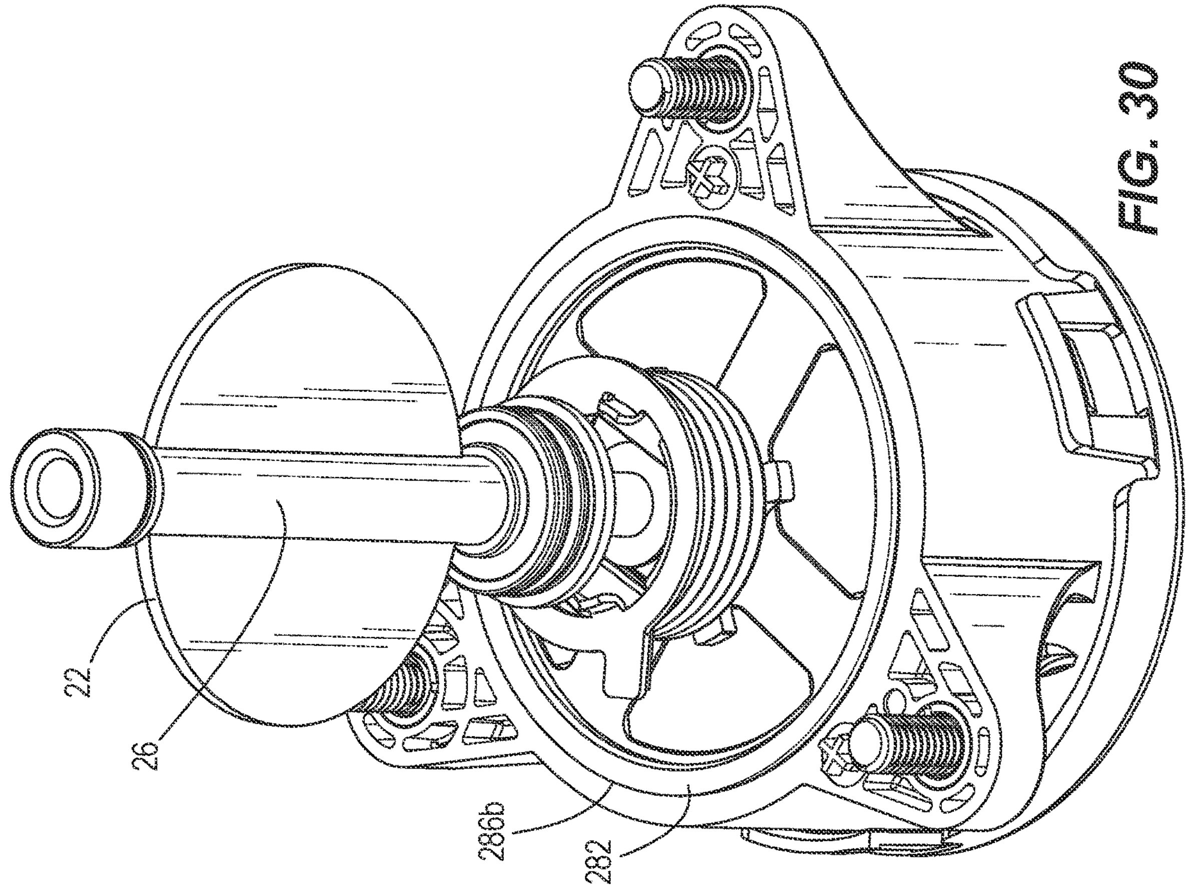
FIG. 30 is a bottom perspective view of the valve assembly of FIG. 1, illustrated with the valve housing portion removed.

With reference to FIGS. 8-9 and 30, a seal 282 is positioned between the valve housing portion 14 and the actuator housing portion 30. The illustrated seal 282 is an O-ring and fits within respective grooves 286*a*, 286*b* defined in the valve housing portion 14 and in the actuator housing portion 30. The seal 282 is configured to inhibit the ingress of dust, dirt, debris, gas, and other material.

In operation of the valve assembly 10, control signals are provided (e.g., to the controller) to control the actuator assembly 34 to position the flap 22 in a desired position in the flow passage 18 for a desired flow of gas through the flow passage 18. The motor 162 pivots the drive shaft 170, causing pivoting movement of the drive bowtie 178 and the spider member 190 against the biasing force of the spring 194. Pivoting movement of the spider member 190 causes pivoting movement of the driven bowtie 182, the driven shaft 26, and the flap 22. The range of motion of the flap 22 is limited by the extent of the angle α1 and a width of the first protrusion 222.

As mentioned above, the driven shaft axis A2 and the drive shaft axis A3 may be misaligned. The spider assembly 174 is configured to transmit torque from the drive shaft 170 to the flap 22 despite a misalignment between the axes A2, A3. If the axes, A2, A3 are misaligned, as the drive bowtie 178 pivots, the drive bowtie 178 may simultaneously slide along the first slot 206. Similarly, as the spider member 190 pivots with the drive bowtie 178, the driven bowtie 182 pivots and may also simultaneously slide along the second slot 210. The sliding movement of the bowties 178, 182 may accommodate axial misalignment of the shafts 170, 26.

Manufacturing tolerances may exist between the drive and driven components. As a result, a certain amount of lash could exist within the spider assembly 174, which could inhibit shafts 170, 26 from rotating on a one-to-one basis at all times and at all rotational angles. In the illustrated construction, the spring 194 biases the components (e.g., to a position corresponding to the closed position of the flap 22) to compensate for the lash. In other constructions (not shown), the spider assembly 174 may be used in other shaft arrangements (e.g., between a different type of drive shaft and driven shaft) to, for example, accommodate misalignment of the shafts, take up lash, etc.

Although the invention has been described in detail with reference to certain preferred embodiments, variations and modifications exist within the scope and spirit of one or more independent aspects of the invention as described above. The embodiment(s) described above and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described.

One or more independent features and/or independent advantages of the invention may be set forth in the claims.

What is claimed is:

1. An exhaust gas recirculation (EGR) valve assembly comprising:

a valve housing including a body with a wall defining a flow passage along a flow path between an inlet and an outlet, the valve housing further defining a bore communicating with the flow passage and extending transverse to the flow path;

a shaft supported in the bore and extending into the flow passage, the shaft including a first end proximate an actuator and a second end distal from the actuator;

a first bearing assembly supporting the shaft at the first end of the shaft, the first bearing assembly spaced apart from the flow passage;

a second bearing assembly supporting the shaft at the second end of the shaft, the second bearing assembly spaced apart from the flow passage;

a flap supported on the shaft in the flow passage, the flap being movable relative to the flow passage between a closed position and an open position, the flap positioned between the first bearing assembly and the second bearing assembly in a direction along a length of the shaft; and a sealing member connected to and projecting from the wall into the flow path, the sealing member having a sealing surface configured to interact with the flap in the closed position to inhibit gas flow through the flow passage, an opposite surface facing away from the sealing surface and tapering toward the wall, and a circumferential end surface proximate the bore, the end surface being tapered away from the bore.

2. The exhaust gas recirculation (EGR) valve assembly of claim 1, wherein the sealing member is a first sealing member, the sealing surface is a first sealing surface configured to interact with a first portion of the flap, the opposite surface is a first opposite surface, and the end surface is a first sealing member end surface, and wherein the exhaust gas recirculation (EGR) valve assembly further comprises a second sealing member positioned between the inlet and the outlet, the second sealing member having a second sealing surface configured to interact with a second portion of the flap in the closed position to inhibit gas flow through the flow passage, a second opposite surface facing away from the second sealing surface and tapering toward the wall, and a circumferential second sealing member end surface proximate the bore, the second sealing member end surface being tapered away from the bore.

3. The exhaust gas recirculation (EGR) valve assembly of claim 2, wherein the bore is a first bore, wherein the valve housing defines a second bore spaced from the first bore, the shaft being supported in the first bore and the second bore, wherein the first sealing member has opposite first sealing member end surfaces, one opposite first sealing member end surface being proximate and tapering away from the first bore, and another opposite first sealing member end surface being proximate and tapering away from the second bore, and wherein the second sealing member has opposite second sealing member end surfaces, one opposite second sealing member end surface being proximate and tapering away from the first bore, and another opposite second sealing member end surface being proximate and tapering away from the second bore.

4. The exhaust gas recirculation (EGR) valve assembly of claim 3, wherein the first opposite surface extends between the opposite first sealing member end surfaces, and wherein the second opposite surface extends between the opposite second sealing member end surfaces.

5. The exhaust gas recirculation (EGR) valve assembly of claim 3, wherein the first portion of the flap is coined against the first sealing surface, and wherein the second portion of the flap is coined against the second sealing surface.

6. The exhaust gas recirculation (EGR) valve assembly of claim 3, wherein the first bore directly contacts the shaft, and wherein the second bore directly contacts the shaft.

7. The exhaust gas recirculation (EGR) valve assembly of claim 3, wherein:

a single first sealing interface surrounds the shaft on a first side of the flap, the single first sealing interface including a first contact interface between the shaft and the wall to inhibit gas leakage between the shaft and the wall, and a single second sealing interface surrounds the shaft on a second side of the flap, the single second sealing interface including a second contact area between the shaft and the wall to inhibit gas leakage between the shaft and the wall.

8. The exhaust gas recirculation (EGR) valve assembly of claim 7, wherein:

the first contact interface includes a first circumferential length equal to a circumference of the shaft at a first axial position along the shaft adjacent the first contact interface, and the second contact interface includes a second circumferential length equal to the circumference of the shaft at a second axial position along the shaft adjacent the second contact interface.

9. The exhaust gas recirculation (EGR) valve assembly of claim 1, wherein the bore is a first bore, wherein the valve housing defines a second bore spaced from the first bore, the shaft being supported in the first bore and the second bore, wherein the sealing member has opposite end surfaces, one opposite end surface being proximate and tapering away from the first bore, and another opposite end surface being proximate and tapering away from the second bore.

10. The exhaust gas recirculation (EGR) valve assembly of claim 9, wherein the opposite surface extends between the opposite end surfaces.

11. The exhaust gas recirculation (EGR) valve assembly of claim 1, wherein the flap is coined against the sealing surface with a force greater than about 4,000 pound-force (lbf).

12. The exhaust gas recirculation (EGR) valve assembly of claim 1, further comprising an actuator assembly including a drive shaft extending along and pivotable about a drive axis, wherein a spider assembly is configured to drivingly connect the drive shaft to the shaft, the spider assembly including:

a spider member defining a first slot facing toward the drive shaft and extending along a first slot axis and a second slot facing toward the shaft and extending along a second slot axis, the second slot axis being transverse to the first slot axis, a first sliding member connectable to the drive shaft and positionable in the first slot, the first sliding member being configured to slide in the first slot and along the first slot axis, and a second sliding member connectable to the shaft and positionable in the second slot, the second sliding member being configured to slide in the second slot and along the second slot axis.

13. The exhaust gas recirculation (EGR) valve assembly of claim 1, wherein the shaft directly contacts an edge of the circumferential end surface tapering away from the bore.

14. The exhaust gas recirculation (EGR) valve assembly of claim 1, wherein no bushing is positioned between the shaft and the circumferential end surface tapering away from the bore.

15. The exhaust gas recirculation (EGR) valve assembly of claim 1, wherein:

the wall contacts the shaft to form a single first contact interface, the single first contact interface surrounding the shaft, the first contact interface is positioned between the flap and the first bearing assembly, a single second contact interface between the wall and the shaft surrounds the shaft, and the second contact interface is positioned between the flap and the second bearing assembly.

16. The exhaust gas recirculation (EGR) valve assembly of claim 1, wherein the first bearing assembly includes a ball bearing, and wherein the second bearing assembly includes a needle bearing.

17. The exhaust gas recirculation (EGR) valve assembly of claim 1, wherein the first bearing assembly is isolated from the flow passage, and wherein the second bearing assembly is isolated from the flow passage.

18. An exhaust gas recirculation (EGR) valve assembly comprising:

a valve housing including a body with a wall defining a flow passage along a flow path between an inlet and an outlet;

a shaft supported by the valve housing and extending into the flow passage, the shaft extending along and being pivotable about a shaft axis;

a flap supported on the shaft in the flow passage, the flap being movable relative to the flow passage between a closed position, in which flow of gas through the flow passage is inhibited, and an open position;

an actuator assembly including a drive shaft extending along and pivotable about a drive axis; and a spider assembly configured to drivingly connect the drive shaft and the shaft, the spider assembly including:

a spider member defining a first slot facing toward the drive shaft and extending along a first slot axis and a second slot facing toward the shaft and extending along a second slot axis, the second slot axis being transverse to the first slot axis, a first sliding member connectable to the drive shaft and positionable in the first slot, the first sliding member being configured to slide in the first slot and along the first slot axis, the first slot restraining movement of the first sliding member in a direction perpendicular to the first slot axis, and a second sliding member connectable to the shaft and positionable in the second slot, the second sliding member being configured to slide in the second slot and along the second slot axis, the second slot restraining movement of the second sliding member in a direction perpendicular to the second slot axis.

19. The exhaust gas recirculation (EGR) valve assembly of claim 18, further comprising a torsion spring engageable between the valve housing and the spider member and configured to bias the flap toward the closed position.

20. The exhaust gas recirculation (EGR) valve assembly of claim 19, wherein the spider member includes a protrusion defining a notch, the torsion spring having an end engaging the notch.

21. The exhaust gas recirculation (EGR) valve assembly of claim 20, wherein the valve housing defines a first recess and a second recess, wherein the protrusion extends into the first recess, and wherein the end of the torsion spring is a first end, and the torsion spring has a second end extending into the second recess.

22. The exhaust gas recirculation (EGR) valve assembly of claim 19, wherein the valve housing defines a bore and has an annular ledge extending about at least a portion of the bore and facing towards the spider member, wherein the shaft is positioned in the bore, and wherein the exhaust gas recirculation (EGR) valve assembly further comprises a spring holder positioned between the ledge and the torsion spring.

23. The exhaust gas recirculation (EGR) valve assembly of claim 22, wherein the spring holder defines an opening, the shaft extending through the opening.

24. The exhaust gas recirculation (EGR) valve assembly of claim 22, wherein the spring holder has a flange positioned between the ledge and the torsion spring, the spring holder also having, extending from the flange, a radially-extending orienting projection engaging a recess defined by the valve housing, an axially-extending centering projection positioned in the bore, and an axially-extending spring positioning projection engaging the torsion spring.

25. The exhaust gas recirculation (EGR) valve assembly of claim 18, further comprising:

a bore, wherein the shaft is positioned in the bore; and a sealing member projecting from the wall into the flow path, the sealing member having a sealing surface configured to interact with the flap in the closed position to inhibit gas flow through the flow passage, an opposite surface facing away from the sealing surface and tapering toward the wall, and a circumferential end surface proximate the bore, the end surface being tapered away from the bore.

26. The exhaust gas recirculation (EGR) valve assembly of claim 25, wherein the flap is coined against the sealing surface with a force greater than about 4,000 lbf.

27. The exhaust gas recirculation (EGR) valve assembly of claim 18, wherein the first slot axis and the second slot axis lie in parallel planes, and wherein the first slot axis is perpendicular to the second slot axis.

28. The exhaust gas recirculation (EGR) valve assembly of claim 18, wherein:

in a first plane perpendicular to the drive axis, the first slot includes a centerline extending between open ends of the first slot;

the first slot axis is oriented along the centerline of the first slot;

in a second plane perpendicular to the shaft axis, the second slot includes a centerline extending between open ends of the second slot; and the second slot axis is oriented along the centerline of the second slot.

* * * * *